(12) United States Patent
Zhdanov et al.

(10) Patent No.: US 11,501,210 B1
(45) Date of Patent: Nov. 15, 2022

(54) ADJUSTING CONFIDENCE THRESHOLDS BASED ON REVIEW AND ML OUTPUTS

(71) Applicant: Amazon Technologies, Inc., Seattle, WA (US)

(72) Inventors: Fedor Zhdanov, Seattle, WA (US); Siddharth Vivek Joshi, Seattle, WA (US); Prateek Sharma, Seattle, WA (US); Alisa V. Shinkorenko, Seattle, WA (US); Warren Barkley, Kirkland, WA (US); Stefano Stefani, Issaquah, WA (US); Krzysztof Chalupka, Bellevue, WA (US); Pietro Perona, Altadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 546 days.

(21) Appl. No.: 16/698,705

(22) Filed: Nov. 27, 2019

(51) Int. Cl.
*G06N 20/00* (2019.01)
*G06N 5/04* (2006.01)

(52) U.S. Cl.
CPC ............... *G06N 20/00* (2019.01); *G06N 5/04* (2013.01)

(58) Field of Classification Search
CPC ................................. G06N 20/00; G06N 5/04
See application file for complete search history.

(56) References Cited

U.S. PATENT DOCUMENTS

| 11,093,487 | B2 * | 8/2021 | Erpenbach | G06F 16/243 |
| 2018/0203922 | A1 * | 7/2018 | Erpenbach | G06F 16/3334 |
| 2019/0243825 | A1 * | 8/2019 | Erpenbach | G06F 40/10 |
| 2020/0320254 | A1 * | 10/2020 | Hebenthal | G06F 16/90332 |

OTHER PUBLICATIONS

Chuan et al., "Machine Learning Based Popularity Regeneration in Caching-Enabled Wireless Networks", 2019 IEEE 30th Annual International Symposium on Personal, Indoorand Mobile Radio Communications, Sep. 8, 2019.*
Tao et al., "Machine Learning Assisted Content Delvery at Edge of Mobile Social Networks", 2019 IEEE Fourth International Conference on Data Science in Cyberspace, Jun. 23, 2019.*
Zhang et all, "Personalized Recommendation with Confidence", 2016 IEEE/WIC/ACM International Conference on Web Intgelligence, Oct. 13, 2016.*
TehariNejad et al., "Improved Machine Learning Using Confidence", 2019 IEEE Canadian Conference of Electrical and Computer Engineering, May 2019.*

* cited by examiner

*Primary Examiner* — Todd L Barker
(74) *Attorney, Agent, or Firm* — Lee & Hayes, P.C.

(57) ABSTRACT

A request associated with reviewing content for a field of interest is received. A confidence is determined associated with the content including the field of interest. A machine learning (ML) model determines a first confidence associated with the content includes the field of interest. The field of interest is transmitted for review in instances where the first confidence is less than a confidence threshold. After review, an indication associated with a reviewer reviewing the content and the first confidence associated with the ML model identifying the field of interest is updated to a second confidence.

20 Claims, 18 Drawing Sheets

← 200A

```
"aiServiceResponse": {
    "moderationLabels": [
        {
            "confidence": 56,
            "name": "Graphic Male Nudity",
            "parentName": "Explicit Nudity"
        },
        {
            "confidence": 66,
            "name": "Nudity",
            "parentName": "Explicit Nudity"
        }
    ]
}
```

```
"aiServiceResponseMetadata": {},
    "fieldsOfInterest" : [
    {
        "FieldOfInterestName": "University Name",
        "FieldOfInterestKeyAliases": [
            "university name", "University", "Uni"
        ]
    },
    {
        "FieldOfInterestName": "State",
        "FieldOfInterestKeyAliases": [
        ]
    }
    ]
},
```

FIG. 2B

CREATE HUMAN REVIEW WORKFLOW

Overview

Name

Extractdatafrominvoice — 902

Location

[                    ] [Browse]

— 904

Task Type

- ● KEY VALUE PAIR EXTRACTION
  Get human review of key value pairs

- ○ IMAGE MODERATION
  Get human review of unsafe content, such as explicit adult content or violent content

- ○ MACHINE LEARNING
  Get human review for the output of ML models

- ○ CUSTOM
  Get human review of your data with a custom machine learning workflow

Conditions for Key Value Pair Extraction

☒ Send any key value pair that does not meet the Identification or Quality confidence scores below for human review Identification — 906

[90.00]

Quality Threshold — 908

[90.00]

☐ Randomly send a sample of documents for human review

Sample Size

[10.00] % ← 910

[CREATE]

FIG. 9

Tasks to Review

| Name ▼ | Task Type ▼ | Status ▼ | Creation Time ▼ | Completion Date ▼ |
|---|---|---|---|---|
| ☑ Extractdatafrominvoice | Key Value Pair | For Review | 10.19.2019 | |
| ☐ Reviewexplicitcontent | Image Recognition | Completed | 09.05.2019 | 9.07.2019 |

REVIEW

REVIEW THE KEY-VALUE PAIRS AND CORRECT THEM IF THEY DO NOT MATCH THE DOCUMENT BELOW

Affordable Lawn Care

Company Name

PO Box 441, Burlington, KY 41005
affordablelawn@gmx.com
589-802-2987

INVOICE

Bill To: Company name
12345 Broad, Redwood City, CA
00000

Invoice No.: 101
Invoice Date: 06/01/2018
Terms:
Due Date: 08/31/2018

| Description | Quantity | Rate | Amount |
|---|---|---|---|
| Mowing service for July 2018. Includes turf mowing, edging, trimming, blowing off surface areas. Pick up and remove of trash/debris. | 1 | $129.00 | $129.00 |

Subtotal $120.00
Discount ($) $0.00
Sales Tax (7.5%) $9.00
Total $129.00
Paid $0.00

Balance Due $129.00

Thank you for your business!

KEY-VALUE PAIRS TO REVIEW

KEY-VALUE PAIR
● YES ○ NO ○ CAN'T FIND
KEY [Company Name]
VALUE [Affordable Lawn Care]
☐ VALUE IS BLANK KEY-VALUE PAIR
● YES ○ NO ○ CAN'T FIND
KEY [affordablelawn@gmx.com]
VALUE [589-802-2987]
☐ VALUE IS BLANK KEY-VALUE PAIR
● YES ○ NO ○ CAN'T FIND
KEY [Commission fee]
VALUE [ ]
☐ VALUE IS BLANK KEY-VALUE PAIR
● YES ○ NO ○ CAN'T FIND
KEY [Term]
VALUE [ ]
☐ VALUE IS BLANK

SUBMIT

INSTRUCTIONS

Click in a key value block or input box to highlight the corresponding key value pair in the content.

If it is a key value pair, review the content for the key or value. If the content is incorrect, correct it.

If it is not a key value relationship, mark it as not being a key value pair.

○ YES  ● NO  ○ CAN'T FIND

If you can't find the key value pair in the content, mark it as can't find.

○ YES  ○ NO  ● CAN'T FIND

Examples

Key and value are often displayed next to each other.

Key and value displayed in one line

| Invoice Date: | 02/01/2018 |

Key and value displayed in two lines

| Amount |
| $120.00 |

If the content of a key or value has multiple lines, enter all the text without line break.

Bill to:  Kate L.
         2317 Broadway, Redwood city, CA
         94063

| Bill to: | |
| Key | Kate L. 2317 Broadway, Redwoo |
| Value | |

REVIEW THE KEY-VALUE PAIRS AND CORRECT THEM IF THEY DO NOT MATCH THE DOCUMENT BELOW — 1102

KEY-VALUE PAIRS TO REVIEW — 1106

KEY-VALUE PAIR
● YES  ○ NO  ○ CAN'T FIND
KEY: Company Name:
VALUE: Affordable Lawn Care
☐ VALUE IS BLANK KEY-VALUE PAIR
● YES  ○ NO  ○ CAN'T FIND
KEY: affordablelawn@gmx.com
VALUE: 589-802-2987
☐ VALUE IS BLANK KEY-VALUE PAIR — 1502
● YES  ○ NO  ○ CAN'T FIND
KEY: Commission fee
VALUE:
☐ VALUE IS BLANK KEY-VALUE PAIR
● YES  ○ NO  ○ CAN'T FIND
KEY: Term
VALUE:
☐ VALUE IS BLANK 1108(3):
○ YES  ○ NO  ● CAN'T FIND
KEY: Commission fee
VALUE:
☐ VALUE IS BLANK

1500

*Affordable Lawn Care*
PO Box 441, Burlington, KY 41005
affordablelawn@gmx.com
589-802-2987

INVOICE

Company Name
Bill To: Company name
12345 Broad, Redwood City, CA
00000

Invoice No.: 101
Invoice Date: 06/01/2018
Terms:
Due Date: 08/31/2018

| Description | Quantity | Rate | Amount |
|---|---|---|---|
| Mowing service for July 2018. Includes turf mowing, edging, trimming, blowing off surface areas. Pick up and remove of trash/debris. | 1 | $129.00 | $129.00 |

Thank you for your business!

Subtotal $120.00
Discount ($) $0.00
Sales Tax (7.5%) $9.00
Total $129.00
Paid $0.00

Balance Due $129.00

SUBMIT

REVIEW THE KEY-VALUE PAIRS AND CORRECT THEM IF THEY DO NOT MATCH THE DOCUMENT BELOW

KEY-VALUE PAIRS TO REVIEW

KEY-VALUE PAIR
● YES  ○ NO  ○ CAN'T FIND
KEY: Company Name:
VALUE: Affordable Lawn Care
☐ VALUE IS BLANK KEY-VALUE PAIR
○ YES  ● NO  ○ CAN'T FIND
KEY: affordablelawn@gmx.com
VALUE: 589-802-2987
☐ VALUE IS BLANK KEY-VALUE PAIR
○ YES  ○ NO  ● CAN'T FIND
KEY: Commission fee
VALUE:
☐ VALUE IS BLANK KEY-VALUE PAIR
○ YES  ○ NO  ○ CAN'T FIND
KEY: Term
VALUE:
■ VALUE IS BLANK Company Name: *Affordable Lawn Care*

PO Box 441, Burlington, KY 41005
affordablelawn@gmx.com
589-802-2987

INVOICE

Bill To: Company name
12345 Broad, Redwood City, CA
00000

Invoice No.: 101
Invoice Date: 06/01/2018
Terms:
Due Date: 08/31/2018

| Description | Quantity | Rate | Amount |
|---|---|---|---|
| Mowing service for July 2018. Includes turf mowing, edging, trimming, blowing off surface areas. Pick up and remove of trash/debris. | 1 | $129.00 | $129.00 |

| | | |
|---|---|---|
| Subtotal | | $120.00 |
| Discount ($) | | $0.00 |
| Sales Tax (7.5%) | | $9.00 |
| Total | | $129.00 |
| Paid | | $0.00 |
| Balance Due | | $129.00 |

Thank you for your business!

SUBMIT

FIG. 17

ADJUSTING CONFIDENCE THRESHOLDS BASED ON REVIEW AND ML OUTPUTS

BACKGROUND

Building datasets to accurately predict outputs of machine learning (ML) algorithms or models is an iterative process. For example, it is common to review and continuously adjust labels, attributes, or annotations of content. In this sense, accurately representing or characterizing the content within the datasets is critical to the quality, training, and accuracy of the ML models. Systems are built to review and update such characteristics and continuously ensure that content is accurately described. If annotations are inaccurate the ML models cannot effectively learn and applied to additional content, leading to inaccurate ML model inferences or predictions. In some instances, workers or reviewers may manually review the content for accuracy to ensure that the content is accurate or that the predictions represent the ground truth. However, reviewers often do not have enough time to analyze all content and/or predictions. Additionally, ML models often lack universalness or scalability to accept various conditional inputs when analyzing content and outputting predictions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 2A illustrates example condition(s) that are specified during a review of content, according to an embodiment of the present disclosure.

FIG. 2B illustrates example condition(s) that are specified during a review of content, according to an embodiment of the present disclosure.

FIG. 9 illustrates example condition(s) associated with requesting a review of content, according to an embodiment of the present disclosure.

FIG. 10 illustrates an example user interface for viewing a dashboard of a reviewer, according to an embodiment of the present disclosure.

FIG. 11 illustrates an example user interface for presenting a review for a reviewer, according to an embodiment of the present disclosure.

FIG. 12 illustrates an example user interface presenting instructions for a reviewer, according to an embodiment of the present disclosure.

FIG. 14 illustrates an example user interface of a reviewer reviewing content, according to an embodiment of the present disclosure.

FIG. 15 illustrates an example user interface of a reviewer reviewing content, according to an embodiment of the present disclosure.

FIG. 17 illustrates an example user interface of a reviewer submitting a review, according to an embodiment of the present disclosure.

DETAILED DESCRIPTION

Figure 1:
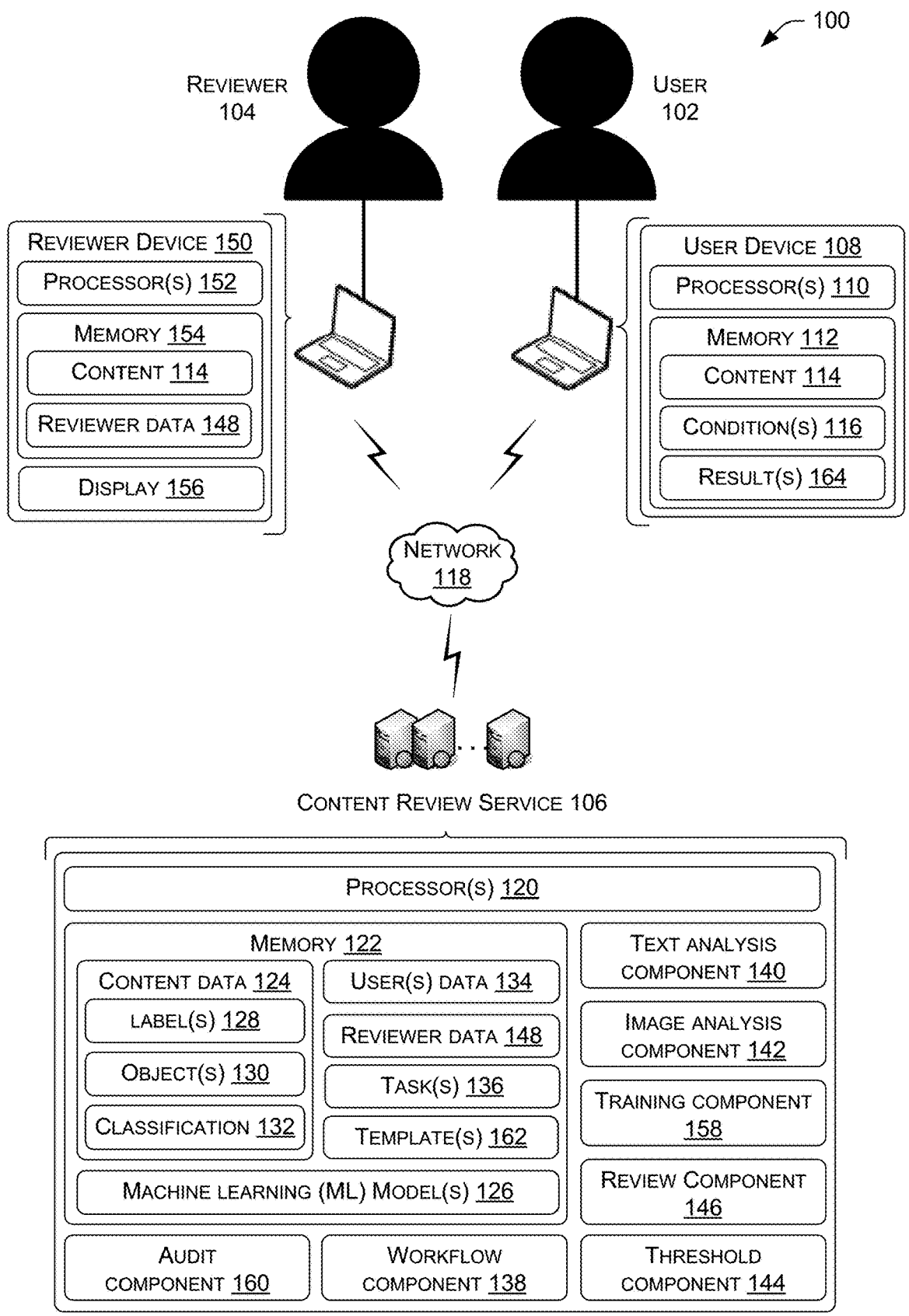
FIG. 1 illustrates an example environment for submitting content for review, according to an embodiment of the present disclosure. The environment illustrates that in some instances, a user may submit a request to a content review service for performing searches, extraction, identification, annotation, and/or review of content using machine learning techniques. The content review service may provide results of the machine learning techniques to one or more reviewer(s) for review. Results of the review may be utilized to retrain the machine learning techniques to more accurately review content in future instances.

Discussed herein, among other things, are systems and methods for accurately inferring or predicting subject matter, fields of interest, or material within various forms of content, such as text, images, videos, or audio. In some instances, the systems and methods may utilize machine learning (ML) models and/or human reviewers to adjust and/or verify predictions output by the ML model(s). For example, the predictions may include text classification or labeling (e.g., assigning tags, categorizing text, mining text, etc.), image classification (e.g., categorizing images into classes), object detection (e.g., locating objects in images via bounding boxes), or semantic segmentation (e.g., locating objects in images with pixel-level precision) associated with the content. In some instances, when generating predictions or analyzing the content, the ML models may utilize conditions or user-defined criteria. For example, users may define confidence scores that are associated with the predicted outputs. If the ML models determine that the confidence score of a prediction is less than a defined confidence (e.g., threshold), the content (or a portion thereof) may be sent for human review. Alternatively, if the ML model(s) determine that the confidence score is greater than the defined confidence threshold, the content may not be sent for human review. Users may therefore define the conditions when predictions or results of the ML model(s) are sent for human review. Based on the review of the ML model(s), the ML models may be trained to increase the confidence and accuracy of the ML models.

ML models typically implement a specific set of rules (e.g., supervised, unsupervised, reinforcement, etc.) when inferring or predicting outputs. For example, in supervised learning, ML models analyze data within datasets in order to apply the ML models to new datasets (or data) for determining or predicting outputs. In this sense, the ML models utilize datasets (e.g., training data) that have been classified, annotated, and/or labeled for determining predictions. In some instances, the ML models may determine a confidence score associated with the prediction or how confident the ML model is in the determined prediction.

By way of example, one or more ML model(s) may analyze an image to determine whether the image contains any animals. As part of this process, the one or more ML model(s) may utilize a training dataset to be able to recognize animals within the image and upon analyzing the image, may output confidence scores associated with any predictions. For example, the one or more ML model(s) may output a first confidence score associated with a first animal being represented in the image, a second confidence score associated with a second animal being represented in the image, a third confidence score associated with a third animal being represented in the image, and so forth. The one or more ML model(s) may output a prediction of which animal is represented in the image based on the highest confidence score. The label with the highest confidence score may represent the predicted output. For example, the one or more ML model(s) may output a confidence score associated with the image containing a fox.

As part of predicting outputs the ML models may perform sub-operations or multiple operations that are related to an overall task. Continuing with the above example, determining whether an image contains a fox or determining a number of foxes that are contained within the image may be segmented or partitioned into multiple operations. For example, as the ML models may be trained from images within the dataset to recognize foxes, the ML models may perform image classification, box bounding, semantic segmentation, label verification, and so forth. As a first operation, the ML models may determine whether the image contains foxes and if so, may draw a box (e.g., bounding box) around all the individual foxes (i.e., each fox may be represented with a bounding box). The bounding boxes may be used to identify a position of the objects of interest within the image. The ML models may determine a confidence score associated with bounding boxes being around all the foxes in the image. After drawing a box around all the fox(es), the ML model may determine whether all the foxes have a box. If so, the ML model may determine a confidence score associated with all the fox(es) in the image being represented within a bounding box. Here, rather than the ML models, for example, determining a single confidence whether boxes are drawn around all the fox(es), at a single instance, segmenting the task into multiple operations permits confidence scores to be calculated at each step or at each determination. That is, for each operation, a confidence score associated with that operation may be determined. In turn, the ML models and/or the human reviewers may identify operations with low confidence scores for further training the ML models and/or determining when to utilize human reviewers. Additionally, segmenting the task into operations allows for the correction of individual operations within the overall task. At scale, the quality of the ML model(s) predicted output may therefore be increased as complex tasks are segmented into multiple tasks.

The systems and methods discussed herein may also extend to other forms of content as well. For example, the ML models may analyze text, such as portable document format (PDF), words, lines, and/or tables. Here, the ML models may determine predicted outputs such as whether the content contains certain items, fields of interest, materials, characters, words, or objects, for example. As applied to text, the ML models may identify key value pairs and for each key value pair, may determine an associated confidence. Keys may represent defined fields of interest while values may represent a value, or instance, of the key. In some instances, multiple ML model(s) may be used to identify key value pairs. For example, a first ML model may determine an associated confidence that the content includes an instance of the field of interest and that there is a value of the field of interest. The confidence in the result of the first ML model may represent a confidence that the words are a key value pair (e.g., that there is a key (or field of interest) and that there is a value for the key. What the text actually is, means, or represents, may be determined by a second ML model and may include a corresponding confidence scores.

By way of example, the ML models may determine whether the content includes a social security number (SSN). In this instance, the key or field of interest may include determining whether the content contains a SSN. In searching the content, the ML model may attempt to find any SSN numbers using text-string matching, mapping techniques, aliases for SSNs, and so forth. If the ML model locates an instance of the SSN, the ML model may output a prediction that the content includes a SSN. Another ML model may determine a value of the SSN, such as the actual SSN (e.g., 0123-45-6789). As similarly discussed above, the ML model may determine a confidence score that the content includes a SSN, or that the returned prediction is a key-value pair. In other words, whether the located number is a SSN. This determination may have an associated confidence score.

Based on the confidence of the ML model(s), the output may be sent for human review. For example, if the key value pairs have a confidence under a certain threshold, reviewers may be asked to review the key value pairs for verification and/or adjustment. Here, if the confidence that the fields represent a key value pair is less than a threshold and/or if the confidence that the words within the fields are less than a threshold, human review may be invoked. As such, if any and/or all of the condition(s) are met, the prediction of the ML model(s) may be output. Alternatively, if the conditions are not met, the prediction of the ML model(s) may not be sent for human review.

The predicted outputs may be reviewed by reviewers to increase the accuracy of the ML models and/or the predicted outputs. For example, if the condition(s) are met, the results of the human review may be compared against those as determined by the ML model(s). If the human review indicates that the output of the ML model is correct, an accuracy of the ML model may be increased. Alternatively, if the human review indicates that the output of the ML model is wrong, or needs to be adjusted, then the accuracy of the ML model may be reduced. However, the results of the human review may be utilized to train the ML models to increase their associated accuracy. For example, if the ML model(s) are accurate, the confidence threshold for screening the results of the predicted outputs may be reduced as the outputs of the ML model(s) are accurate.

In some instances, a group of reviewers may audit the content and/or review the predicted outputs to verify the accuracy of the ML model(s). For example, training an image classification ML model may include inputting images as well as their associated labels. Each label may represent an identifier of a distinct concept, or class, that the image classification ML model will learn to recognize. Given sufficient training datasets, the image classification ML model may learn to predict whether new images are classified into, or belong to, any of the classes the image classification ML model was or has been trained on. For example, to perform a prediction that the image belongs to a class, the image is input (or passed into) the image classification ML model. Overtime, the training datasets may become outdated or previously classified images may be updated or adjusted to new classifications or with new annotations. As part of this process, the ML models may randomly select a subset of the training dataset for verification and/or adjustment. Herein, with the new or updated training dataset, the ML model may determine predicted outputs and compare the predicted outputs with confidence scores. As the content within the training datasets is updated to accurately represent the ground truth, the confidence scores and the accuracy of the predicted outputs may increase. Additionally, or alternatively, the predicted outputs may be sent to reviewers to verify the accuracy of the labels (e.g., whether the labels are correct) or adjust the labels if needed (e.g., in instances where the labels are wrong), for example.

In some instances, only a subset of the content reviewed or the predicted outputs may be sent for review based on one or more conditions (e.g., confidence thresholds, confidences between certain ranges, etc.) or other user-defined criteria. In other words, the ML models may identify predicted outputs for review and/or to be checked by human reviewers. For example, in some instances, a reviewer may be asked to review a subset of the predicted outputs rather than all predicted outputs or predictions within the content. The image may, for example, have multiple objects and the ML model may determine specific labels for review, as compared to having the reviewer verify or relabel all the objects within the image. For example, the image may contain three objects and the reviewer may only be asked to review one of the objects that has a label below the threshold confidence or which is unable to be identified above a certain confidence. The amount review performed by the reviewers, or the specific tasks requested of the reviewers, may therefore be limited or focused on certain predicted outputs or portions of the content.

In some instances, the reviewers may review the predictions through interacting with user interfaces presented on a device. The user interfaces may be presented to the reviewers for inspecting the content and providing human-generated answers. The user interfaces may present the reviewers with cues for which predicted outputs to verify or adjust. In some instances, the user interfaces may present the content being reviewed and/or may also highlight, outline, or otherwise indicate the predicted output within the content and/or a location or position of the predicted within the content. For example, for an image being reviewed, the user interface may display a box around a fox and ask the reviewer to confirm that the box is around the fox, or that a fox is represented within the box. Such visual indications or cues may decrease an amount of time a reviewer spends reviewing the predicted outputs and lead to more accurate labeling.

Upon receiving the verifications and/or readjustments from the reviewers, as noted above, the ML models may be retrained to more accurately predict outputs. This iterative process may repeat to maintain up-to-date training datasets for accurately applying the ML models to subsequent content. In this process, the systems and methods discussed herein may update thresholds associated with the confidences scores of the predicted outputs. The systems and methods discussed herein may keep up-to-date confidence thresholds for given applications. For example, the ML models may maintain confidence thresholds associated with their associated functions, such as recognizing certain characters with text, objects within images, and so forth. These confidence thresholds may generally reflect how accurate the ML models are for use in determining an amount of human review and/or presenting recommendations to user.

In some instances, the ML models may be retrained or calibrated from a calibration set of data within the dataset. In some instances, the calibration set may include predicted outputs from the ML models as well as outputs provided by the reviewers. The calibration set may, in some instances, represent new content recently added to the dataset as well as old content within the dataset. For example, old content within the dataset may be periodically removed from the calibration set based on various expiration and/or sampling strategies. In some instances, content within the dataset may be randomly sampled for inclusion within the calibration set. Additionally, or alternatively, a percent or sampling of newly added content to the dataset may be randomly chosen for inclusion within the calibration set. Through the calibration set, the confidence thresholds of the ML models may be re-computed by iterating the data within the dataset and then comparing the predicted outputs with human review. The desired confidence thresholds may be influenced, in some instances, by accuracy, precision, and/or other recall configurations.

In light of the above, the systems and methods discussed and described herein may reduce review time and/or errors associated with reviewing, thereby increasing efficiency and accuracy. For example, results of the ML model(s) may be selectively checked and/or reviewed by human reviewers to ensure the accuracy of the ML model(s) based on condition(s) provided by users. Compared to conventional techniques that may rely heavily on human reviews, the systems and methods discussed herein may conditionally and meaningfully surface content for review, which may reduce costs, labor, and time required of human reviewers. For example, conventionally, annotating a large number of images is difficult and humans may spend significant time and effort labeling objects within images, for instance. While the number of human interaction may be limited, reducing the amount of human involvement may greatly impact performance. Finding the balance between automated ML model(s) and human review may increase accuracies of the review. Accordingly, users may input condition(s) associated with searching, analyzing, annotating, or otherwise reviewing content and if these conditions are met, the content (or a portion thereof) that satisfies the condition(s) may be sent for review. Based on these reviews, for example, the systems and methods discussed herein may utilize human reviewers to verify and/or adjust the outputs to retrain the model. The ML model(s) may then be updated in an iterative fashion to increase the accuracy of the ML model(s) and reduce the amount of human review, in some instances, and/or depending on the condition(s) as specified by the user. Confidences associated with the accuracy of the ML model(s) may correspondingly be updated as well. Additionally, randomly selecting content that both satisfies the conditions and does not satisfy the conditions for review may ensure quality and ML model performance.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 for analyzing content and providing reviews to increase accuracies of machine learning (ML) models. In some instances, content may be provided for review by one or more services to analyze the content based on one or more requested conditions, as discussed herein. Such conditions may be provided to the one or more services, and based on the results of the analysis, the results may be fed back into the ML models to increase their associated accuracy and confidence thresholds. In some instances, one or more reviewer(s) may review results of the ML model(s) to verify and/or adjust outputs.

As shown, and in some instances, the environment 100 may include a user 102, a reviewer 104, and a content review service 106. The user 102 may operate one or more user devices, such as a user device 108, having processor(s) 110 and memory 112. The user 102 may interact with the user device 108 to provide content 114 and/or condition(s) 116 associated with analyzing, reviewing, or searching the content 114 for certain fields of interest. In some instances, the fields of interest may correspond to what the user 102 is looking for or requesting within the content 114. For example, the fields of interest may include subject matter or material the user 102 is requesting to search for within the content 114 and/or material the user 102 request be annotated and/or labeled.

The content 114 and/or the condition(s) 116 may be stored in the memory 112, or the memory 112 may otherwise have access to the content 114 and/or the condition(s) 116. In some instances, the user 102 may be permitted to use a domain specific language for scripting or providing the condition(s) 116 and which the content review service 106 is configured to utilize. The condition(s) 116 may therefore represent in some instances when human review of the content 114 is warranted, routed to reviewers (e.g., the reviewer 104) or the conditions associated with when human review is invoked, as discussed herein.

The content 114 and/or the condition(s) 116 may be provided to the content review service 106 via or over a network 118. The network 118 may communicatively couple the user device 108 and the content review service 106 using wireless technologies (e.g., RF, cellular, satellite, Bluetooth, etc.), or other connection technologies. The content review service 106 may include a computing system, various modules, components, data stores, and the like. In some instances, the content review service 106 may be implemented as one or more servers and may, in some instances, form a portion of a network-accessible computing platform implemented as a computing infrastructure of processors, storage, software, data access, and so forth that is maintained and accessible via a network (e.g. the network 118) such as the Internet. The content review service 106 does not require end-user knowledge of the physical location and configuration of the system that delivers the services. Common expressions associated with these one or more servers may include "on-demand computing," "software as a service (SaaS)," "platform computing," "network-accessible platform," "cloud services," "data centers," and so forth.

The content review service 106 is shown including processor(s) 120 and memory 122. The processor(s) 120 may carry out or otherwise perform operations associated with analyzing the content 114 based on the condition(s) 116 and the field of interest(s) as provided by the user 102 (or other information within the request). In some instances, the content review service 106 may search for the field(s) of interest using the literal terms as requested by the user 102 or aliases or other associated common terms. In some instances, the content review service 106 may be configured to communicate with application program interfaces (APIs) of the user device 108 (or the content 114 of the user 102) to review the content 114.

As illustrated, the memory 122 may have access or otherwise store content data 124. The content data 124 may represent content stored by the content review service 106 and which is usable to train machine learning (ML) model(s) 126 or which the ML model(s) 126 utilize to search content. For example, in some instances, the content data 124 may represent content including words, text (e.g., paragraphs, sentences, bullet points, etc.), graphs, tables, charts, images, videos, audio, symbols, and so forth. In some instances, the content may be in the form of PDFs, text or word documents, handwritten text, images, video, audio, and so forth.

As illustrated, the content data 124 or the content may include or be stored in association with label(s) 128, object(s) 130, and/or a classification 132. The label(s) 128 may include labels of the content that characterizes or describes the content. For example, the label(s) 128 may indicate whether a piece of content includes certain characters or words. The label(s) 128 may also indicate tags of the content, such as a topic of an article, whether an image contains a cow, words that are spoken within an audio recording, actions associated with a video recording, and so forth. The label(s) 128 may help identify or describe the content stored in the memory 124 and which are usable by the ML model(s) 126 when analyzing content. In some instances, the label(s) 128 may be determined via the ML model(s) 126 and/or human annotators or reviewers.

The content data 124 may also include the object(s) 130. The object(s) 130 may describe the item(s) or field(s) of interest of the content or what is depicted in the content. For example, the object(s) 130 may correspond to separate objects or item(s) in the content, such as person(s), animal(s), commodities (e.g., sport equipment, household goods, etc.), and so forth. In some instances, the object(s) 130 within the content may be identified via bounding boxes, semantic segmentation, and/or other techniques. In some instances, the object(s) 130 may be associated with the label(s) 128. For example, the object(s) 130 may be identified or labeled via the label(s) 128 (e.g., an object may be labeled as a cow). In some instances, the object(s) 130 may be determined via the ML model(s) 126 and/or the human annotators or reviewers.

The content data 124 may also include the classification 132 of the content. For example, the classification 132 may include a class associated with the content. The classification 132 may assist in organizing or grouping like content. For example, content may be classified as pertaining to certain categories (e.g., sports) and based on this classification, like content may be linked or mapped together. Such classification may assist in identifying certain objects or labeling objects or item(s) within the content.

As discussed herein, the content data 124 may be utilized by the content review service 106 for training the ML model(s) 126. For example, knowing the label(s) 128, the object(s) 130, and/or the classification 132 (or other identifying characteristics of the features within the content), the content review service 106 may train the ML model(s) 126 to identify item(s), field(s) of interest, or search for subject matter within the content 114. The ML model(s) 126 may also be utilized to annotate the material or subject matter within the content 114. The content data 124 or the characteristics of the content 114, may be continuously updated for training the ML model(s) 126 such that the ML model(s) 126 may accurately identify the subject matter within the content 114 and/or annotate the subject matter within the content 114.

The memory 122 may further store or have access to user(s) data 134 that is associated with user(s) of the content review service 106, such as the user 102. In some instances, the user(s) data 134 may include identifying information of the user(s) and/or information associated with requests of the user(s) (e.g., current requests, previous requests, history of the user(s), and so forth). For example, the user(s) data 134 may store the condition(s) 116 as provided by the user(s), request(s) of the user(s), result(s) of the user(s) search(es), and so forth.

To briefly illustrate and by way of example, envision that the user 102 represents a business or corporation hosting content. The user 102 may seek a review of content presented on a website of the corporation before posting or making the website available to the public. Beforehand, however, the user 102 may request an analysis or search of the content (e.g., the content 114) to determine whether the content contains offensive or violent behavior. In some instances, the offensive or violent behavior may be in the form of images, text, video, and/or audio. In this example, the user 102 may provide the content 114 to the content review service 106 for analysis, or in some instances, the content review service 106 may access the content on behalf of the user (e.g., using APIs). As part of this process, the user 102 may provide the condition(s) 116 associated with the analysis to be performed by the content review service 106. The content review service 106 may utilize the condition(s) 116 (or the condition(s) 116 as entered in the DSL) and combine the condition(s) 116 with logic and/or determine review of the content 114 is warranted. That is, the ML model(s) may utilize the condition(s) provided by the user 102 to analyze the content 114. The user 102 may request, as conditions, that the content review service 106 review the content for offensive or violent behavior.

In some instances, the user 102 may also provide a confidence level associated with the review of the content 114. For example, the user 102 may request that the content review service 106 identify offensive or violent behavior with 90 percent confidence. In some instances, the condition(s) may indicate whether the user desires to utilize a stateless threshold (e.g., absolute confidence threshold that does not change with time), a stateful calibrated non-adaptive threshold (e.g., trained threshold without updated calibration set), or a stateful calibrate adaptive threshold (e.g., trained threshold with updated calibration set). The condition(s) may also indicate a range of confidences that trigger human review. For example, confidences between 0.25 and 0.7 is sent may be sent for human review.

These condition(s) 116 may be provided to the content review service 106 and the therein, the content review service 106, or components thereof, may search the content 114 for the offensive or violent behavior using the ML model(s) 126. If the content review service 106 determines that field(s) of interest within the content 114 do not contain offensive or violent behavior, with 90 percent confidence, the content 114 may not be sent for review. Alternatively, if the content review service 106 is unable to determine whether the content 114 contains offensive or violent behavior, with at least 90 percent confidence, the content 114 may be sent for review.

In some instances, the ML model(s) 126 may represent models or algorithms that are previously trained (e.g., using the content data 124) to identify or perform various operations associated with the provided content (e.g., object recognition, annotation, labeling, etc.). In some instances, the memory 122 may store a plurality of ML model(s) 126 that are previously trained to identify the one or more requested item(s) or field(s) of interest in the content 114. In this sense, each of the ML model(s) 126 may be trained to identify specific content, subject matter, fields of interest, material, and so forth within the provided content 114.

In some instances, more than one ML model(s) 126 may be utilized when carrying out requests. For example, a first ML model may identify objects within an image and a second ML model may label the objects. In some instances, each of the ML model(s) 126 may be previously trained from a specific subset of the content data 124 and/or a calibration set within the content data 124. However, the ML model(s) 126 may also be trained on content provided by users using a training dataset provided by the user, as well as annotations or labels from human reviewers and/or ML model(s). In some instances, the calibration set may represent content having high thresholding statistics or a high mean average precision (mAP). In other words, the calibration set utilized to train the ML model(s) 126 may have high confidence values and which the ML model(s) are able to confidently determine the material or field(s) of interest contained therein. For example, the calibration set may include content having a mAP in the top ten percentile of the mean class confidence.

Upon receiving the request from the user 102, the content review service 106 may be configured to perform various task(s) 136 associated with searching, reviewing, or analyzing the content 114. For examples, the task(s) 136 may include extracting text from the content 114, classifying images or objects within the content 114, detecting objects or labels within the content 114, drawing bounding boxes around characters, labels, or objects within the content 114, performing semantic segmentation on the content 114, and/or verifying labels within the content 114. However, the content review service 106 may be configured to perform various other task(s) as requested by the user 102, or the task(s) 136 may include other tasks performable by the content review service 106.

As part of performing the task(s) 136 the content review service 106 may determine aliases or like fields of interest associated with the request. For example, if the request includes searching for offensive or violent behavior, aliases may include "curse words," "profanity," "weapons," "nudity," and so forth. The ML model(s) 126 may utilize the aliases when searching the content 114 to more completely encompass and carry out the request of the user 102. In some instances, the content review service 106 may determine the aliases or the user 102 may provide the aliases.

In some instances, the task(s) 136 may be determined by a workflow component 138 of the content review service 106. The workflow component 138 may determine the task(s) 136 or the operations to be performed by the content review service 106 when analyzing the content 114 and based on the request of the user 102. In some instances, the task(s) 136 performed by the content review service 106 may depend on the specific request of the user 102, such as the content 114 being requested for review and/or the condition(s) 116 associated with the request. Herein, each of the task(s) 136 may have a corresponding order of operations, or a sequence of steps, and perform to carry out the request of the user 102. Each task may also include corresponding ML model(s) 126 that are utilized to perform the operations, or which ML model(s) perform the specific steps of the task. Upon receiving the request, for instance, the content review service 106 may analyze the request and select one or more corresponding task(s) to be completed. For example, a first task may include reviewing the content to recognize objects (e.g., violent behavior) and a second task may include analyzing the objects to determine whether the objects correspond to violent or offensive behavior. These task(s), which include associated operations, may include a set of instructions that are performed by the content review service 106. Furthermore, each of the task(s) 136 may identify one or more of the ML model(s) 126 that are configured to perform the operations or which ML model is to perform the operations of the task.

Furthermore, as noted above, the task(s) 136 may identify when review of the content, or the results of the ML model(s) 126 is warranted, based on the condition(s) 116 being given a semantic meaning and which are utilized by the content review service 106. Accordingly, the user 102 may provide the condition(s) 116 associated with the review and/or when the content 114, or the results of the ML model(s) 126 are transmitted for review by one or more reviewers.

To perform the request of the user 102, the content review service 106 may include various components, such as a text analysis component 140, an image analysis component 142, and a threshold component 144. In some instances, based on the request of the user 102 and/or the content 114 being analyzed, the content review service 106 may select a corresponding component. In some instances, the component may be determined based on the task(s) 136 to be performed. For example, the text analysis component 140 may analyze text of the content, using one or more of the ML model(s) 126, to perform the task(s) 136 associated with the request of the user 102. The text analysis component 140 may be configured to mine, locate, analyze, or otherwise search for fields of interest, characters, items, or other subject matter within the content 114 using ML models. For example, in the scenario where the user 102 requests to search the content 114 to identify offensive language, the text analysis component 140 may search the content 114 to identify fields of interest or language deemed to be offensive (as trained from the content data 124). In some instances, the result(s) of the text analysis component 140 may be provided to one or more of the ML model(s) 126 to determine whether the content contains any fields or subject matter corresponding to the request of the user 102, vice versa. For example, after identifying fields of the interest within the content 114, the ML model(s) 126 may provide or indicate the field(s) of interest to the text analysis component 140, which may utilize another ML model to extract the words and analyze the words to determine whether the content 114 contains offensive language. In some instances, the text analysis component 140 may utilize various techniques, such as optical character recognition to analyze tables, equations, characters, symbols check boxes, and so forth.

Similarly, the image analysis component 142 may analyze content that contains images. The image analysis component 142 may be configured to perform various operations, such as box bounding or semantic segmentation, to otherwise search for fields of interest, characters, items, or other subject matter within the content corresponding to the request of the user 102. For example, in the scenario where the user 102 requests to search the content 114 to identify offensive material, the image analysis component 142 may search the content 114 to identify objects or fields of interest. In this process, the image analysis component 142 may utilize the ML model(s) 126 or ML model(s) 126 may be utilized to determine objects within the content 114. Thereinafter, one or more additional ML model(s) 126 may analyze the objects and determine whether the objects are deemed to be offensive (e.g., as trained from the content data 124). Additionally, or alternatively, in some instances, the result(s) of the image analysis component 142 (e.g., bounding boxes) may be provided to one or more of the ML model(s) 126 to determine whether the content contains any fields or subject matter corresponding to the request of the user 102. Bounding boxes may also identify the location of the objects of interest within the content 114. In doing so, the image analysis component 142 may use one or more ML model(s) 126 to classify or detect one or more field(s) of interest within the images and may store the content with an indication of a classification for the one or more field(s) of interest.

In some instances, based on the task(s) 136 to be performed by the content review service 106, the text analysis component 140 and/or the image analysis component 142 may analyze the content 114. Furthermore, in this scenario, corresponding ML model(s) 126 may be utilized to analyze the results of the text analysis component 140 and/or the image analysis component 142 to carry out the request of the user 102. Additional, although the content review service 106 is shown including certain components to analyze the content 114, the content review service 106 may include various other components for analyzing the content, such as a video analysis component for analyzing videos and/or an audio analysis component for analyzing audio.

The threshold component 144 may be utilized to determine confidence thresholds associated with the results of the ML model(s) 126, or which the ML model(s) 126 utilize when searching the content 114 for the fields of interest. For example, each of the ML model(s) 126 may be associated with a confidence threshold corresponding to searching for the fields of interest within the request of the user 102. Such confidences may represent a confidence or sureness that the returned or identified fields of interest within the content 114 correspond to the request of the user 102. Stated alternatively, the confidence may represent a percentage of likelihood that the ML model(s) 126 are accurate in detecting, searching, or identifying the fields of interest as requested by the user 102. In some instances, the confidence of the ML model(s) 126 may be determined based on a size of the training dataset and/or previous results of the ML model(s) 126. For example, if the user 102 requests the content review service 106 to identify offensive language within the content 114, the confidence may represent the ML model(s) 126 confidence that returned results of the search is, or represents, offensive language or that the results do not represent offensive language. For each of the ML model(s) 126, the threshold component 144 may identify whether the results of the ML model(s) 126 are above the confidence threshold or below the confidence threshold for use in triggering a review of the result(s).

The threshold component 144 may be configured to analyze the result(s) of the ML model(s) 126 based on the provide condition(s) 116 from the user 102. For example, if the user 102 requests that subject matter be identified based on a certain confidence level, the threshold component 144 may analyze the results using the provided confidence level of the user. However, in some instances, if the user does not provide a confidence as part of the condition(s) 116, the threshold component 144 may utilize a default confidence associated with the ML model(s) 126. Thresholds may also be determined using other techniques (e.g., stateful calibrated adaptive). The threshold component 144 may therefore determine whether the output of the ML model(s) 126 satisfies the conditions, and if not, may transmit the content for review. The results of the review may impact the confidence threshold and may be utilized to adjust the confidence of the ML model(s) 126.

After determining the confidences (or other results) and comparing to the condition(s), if the conditions are met the content may be provided by to the reviewer 104 for review, as discussed herein. For example, envision that if the ML model(s) are not confident that the ML model(s) 126 determine offensive or violent behavior above 90 percent, the ML model(s) 126 may transmit the content 114 for review. If the reviewer 104 agrees with the results or the output of the ML model(s) 126, the confidence of the ML model may increase from 90 percent to 95 percent. The ML model may also be trained via the review. Generally, the confidence of the ML model may represent the accuracy of the ML model to detect or identify the fields of interest of the user. That is, raising the confidence threshold may symbolize that the results of the ML model(s) 126 are accurate and that the outputs of the ML model(s) 126 may have a higher confidence. The confidence threshold may therefore be adapted based on the results of the ML model(s) 126 and a review of outputs of the ML model(s) 126 as determined by the reviewer 104, for example. As discussed herein, the dataset utilized to adapt the threshold may be based on a random sampling of the content 114 provided by the user 102 and through comparing the results of the ML model(s) 126 with the results of the reviewer 104 (or other reviewers).

Noted above, in some instances, the threshold component 144 may utilize various techniques for adapting the threshold or determining the confidence thresholds, such as trivial, stateless, stateful non-adaptive, stateful adaptive, etc. For example, in trivial applications, the output(s) of the ML model(s) 126 may be sent for human review for confirmation and/or adjustment. Therein, the results of the review may be compared against the output of the ML model(s) 126 to update inconsistencies and the threshold confidence levels. In stateless applications, the user 102 may provide absolute confidence thresholds when reviewing the content 114. Positive confidence above 0.9, for example, may be accepted and not sent for review and/or positive confidence below 0.2 may be accepted and not sent for review. Confidences between 0.7 and 0.25 may be sent for verification. For stateful calibrated non-adaptive, users may be provided with the expected accuracy threshold of the annotations against those of human labelers (e.g., the results of the ML model(s) 126 and the results of the reviewer(s)). To find an associated threshold, a calibration set may be provided and the results of the human reviews and the ML model(s) may be determined. Of all the content within the dataset, the calibration set may be determined as a fraction of the dataset or randomly selected from the dataset. However, in stateful calibrated non-adaptive, the calibration set may not change in time. In stateful calibrated adaptive applications, the calibration set may evolve over time and the most recent data may be used for calibrating the threshold. In such instances, older data may be discarded or removed from the calibration set. Other techniques may be utilized as well, such as gaussian processes (e.g., a regression algorithm that allows non-monotone fits, but estimates standard deviation of the prediction), isotonic regression (e.g., (a regression algorithm that imposes a non-decreasing fit), and so forth.

As discussed above, in some instances, the content review service 106 may utilize multiple ML model(s) 126 when performing certain task(s) 136. For example, a first ML model may determine the presence of a field of interest within the content 114 and a second ML model may determine the actual text of the field of interest. In the above example, for instance, the first ML model may search for the field of interest, commonly referred to as a "key" within the content 114 and an instance of the field of interest within the content, commonly referred to as a "value." The first ML model may determine, or have, an associated confidence that the content includes an instance of the field of interest and that there is an associated value of that interest. In some instances, the first ML model may place a bounding box around the field of interest and/or the value for use by a second ML model. The bounding box, for example, may represent the predicted presence of the key value pair or that there appears to be a key value pair within the content. As part of this process, the confidence as determined by the first ML model may represent a confidence that the words are a key value pair (e.g., that there is a key (or field of interest) and that there is a value for the key). However, what the text actually is, means, or represents, may be determined by a second ML model. The confidence of the first ML model and the second ML model may be compared against thresholds before determining whether to send the content for review or whether the predicted outputs are trustworthy and accurate.

For example, for the outputs of the respective ML model(s) 126, the threshold component 144 may determine whether the outputs satisfy a certain confidence threshold(s). The outputs of each of the ML model(s) 126 may therefore include a confidence that is compared against thresholds for use in assigning or determining whether to invoke review (based on the provided conditions). Performing each step or operation of the task therefore allows for the operations to be checked for confidence levels for use in identifying which ML model(s) 126 need to be further trained or which ML model(s) 126 are accurate. Such pinpointing may also a focused review of the ML model(s) 126.

In some instances, the fields of interest (e.g., keys, values, objects, etc.) may be flagged by for analysis by additional ML model(s) 126 to determine whether the words, for instance, within the bounding boxes correspond to the request of the user (e.g., whether the words within the bounding boxes represent offensive language). In some instances, the second ML model may utilize a X-position and/or Y-position of the bounding box for analyzing the words within the bounding box.

After the results or analysis of the content 114, the content review service 106 may determine one or more review(s) via a review component 146 and which are provided to the reviewer 104. In some instances, the review component 146 may be configured to organize or assemble the results of the search performed by the content review service 106 (e.g., via the text analysis component 140 and/or the image analysis component 142), the ML model(s) 126, and/or based on the determinations of the threshold component 144. For example, in analyzing the content 114, the content review service 106 may determine certain item(s) or fields of interest within the content 114 that are unrecognized and/or which the content review service 106 was unable to determine, above the confidence threshold, whether they correspond to the subject matter or request of the user 102. By way of example, if the content review service 106 was unable to recognize an item within the content, or determine above the confidence level, that the item(s) correspond to offensive language, the review component 146 may flag these item(s) for review.

In some instances, the review component 146 may generate reviewer data 148 that is associated with or represents the review to be performed. For example, the reviewer data

148 may indicate the item(s) or fields of interest for review by the reviewer 104. In some instances, the reviewer data 148 may include the item(s) presented in association with the content 114 that the reviewer 104 utilizes when reviewing. For example, FIG. 1 illustrates that the reviewer 104 includes a reviewer device 150 that communicatively couples to the user device 108 and/or the content review service 106 via the network 118. The reviewer 104 may utilize the reviewer device 150 when reviewing the reviews as generated by the content review service 106 (e.g., the review component 146).

As illustrated, the reviewer device 150 includes processor(s) 152 and memory 154 that stores or otherwise has access to the content 114 (or a portion of the content 114) and the reviewer data 148 that represents the reviews to be performed by the reviewer 104. The reviewer device 150 further includes a display 156 for presenting the reviews. In some instances, the reviewer device 150 may be configured to display a series of user interfaces within which the reviewer 104 interacts to perform the reviews, as discussed in detail later.

The reviewer device 150 may display, via the display 156 and utilizing the reviewer data 148, the reviews in association with the content 114. Displaying the reviews and the content may include highlighting or otherwise indicating (e.g., boxes, outlines, etc.), within the content 114, where the reviewer 104 is to review the fields of interest or what the reviewer 104 is to review. Such indications may assist the reviewer 104 in locating his or her reviews within the content 114 for verifying or adjusting the results (e.g., predictions) of the content review service 106. For example, in the example of locating offensive language, the content 114 (e.g., document) or portion of the content 114 that allegedly contains the offensive language may be presented on the display 156. Also on the display 156, the term, object, symbol, text, field of interest etc. that the ML model(s) 126 predicted below the confidence level may be displayed with a box, outline, or highlight. This indication may visually indicate to the reviewer 104 where within the content 114 the reviewer 104 is to review or what item(s) within the content 114 the reviewer 104 is to review. In this sense, the reviewer 104 may be focused to specific areas or fields of interest within the content 114. Such focusing and targeted review may assist in decreasing a review time of the reviewer 104.

Using the user interface(s), the reviewer 104 may scroll through or otherwise move through the review(s). In some instances, the review(s) may be associated with a single piece of content (e.g., single document) in which the reviewer 104 reviews multiple items or field(s) of interest within the content 114, or multiple pieces of content (e.g., multiple documents) in which the reviewer 104 reviews fields of interest across the content. For example, in the event that the user 102 requests a search of the content to locate offensive language, a first instance of a first predicted word (or other character) may be presented on the display 156 in unison with a second instance of a second predicted word (or other character) on the display 156 for review. In other instances, the reviewer 104 may first review the first instance, provide results or a review of the first review, and thereafter, may review of the second instance. As discussed above, the first instance of the predicted first offensive word may be highlighted within the content and the second instances of the second predicted offensive word may be highlighted within the content.

In some instances, the review(s) displayed on the reviewer device 150 may be presented in an order of importance. For example, the reviewer 104 may have a plurality of reviews to review, and a higher priority review may be presented for review first. Thereafter, less prioritized reviews may be presented. In some instances, the priority of the reviews may be based at least in part on a time sensitive nature of the review(s) or the condition(s) 116 as requested by the user 102. Additionally, or alternatively, the review(s) may be organized in an order of confidence. For example, the most confident item(s) or field(s) of interest may be presented for review first, followed by the least confidence item(s).

In some instances, the reviewer device 150 may also display a dashboard that includes the reviews for the reviewer 104. For example, the reviewer 104 may have several reviews queued or awaiting review. Such reviews may be displayed on a dashboard of the reviewer 104 and the reviewer 104 may cycle through the reviews. In some instances, the dashboard may display the total number of reviews to be conducted, the completed reviews, pending reviews, and/or a type of content to be reviewed (e.g., image, text, video, audio, etc.).

After reviewing the review(s), the reviewer 104 may transmit the review(s) to the content review service 106. The content review service 106 may utilize the review(s), or the results of the review(s) to further training the ML model(s) 126 via a training component 158. For example, the review(s) received from the reviewer 104 may indicate whether the item(s) predicted by the ML model(s) 126, as corresponding to the request of the user 102, where correct or incorrect. The review(s) may also indicate adjustment(s) in the item(s) as reviewed. For example, the reviewer 104 may identify one or more item(s) within the content 114 as corresponding to the request of the user 102 but which were not identified by the ML model(s) 126. In future instances, for example, the training of the ML model(s) 126 via the training component 158 may more accurately identify the field(s) of interest. Further, such reviews (or the reviewed content) may be stored in the memory 122 of the content review service 106 for use in training the ML model(s) 126 or updating the content data 124.

The content review service 106 is further shown including an audit component 160. The audit component 160 may be configured to audit or ensure an accuracy of the ML model(s) 126, or the results of the ML model(s) 126. In some instances, the audit component 160 may compile content for review by the reviewer 104 (or other reviewers). The content compiled for auditing may include those item(s) the content review service 106 identifies above a threshold confidence and/or below a threshold confidence. In this sense, the audited content may include content that the content review service 106 has identified above the threshold level and/or below the threshold level. In some instances, the audited content may include a random sampling of content within the content data 124 such that the reviewer 104 may confirm those item(s) the content review service 106 confidently determines and does not confidently determine, or is unable to determine. Such sampling may ensure that the ML model(s) 126 are up to date and accurately trained. In some instances, the audit component 160 may automatically select a certain percentage of the requests (or the results) for review. In some instances, the audits may be assigned for review to multiple review teams(s) or may be assigned to reviewer(s) trained for the specific content, and thereafter, the results of the reviewers may be compared to identify commonalities when training the ML model(s) 126 and determining their associated accuracies. Audits may also be performed based on experience levels.

In some instances, the user 102 may utilize template(s) 162 provided by the content review service 106 when issuing the request. The template(s) 162 may include various forms or pre-configured requests performable by the content review service 106. For example, the template(s) 162 may include fields populated by the user 102 when requesting a search. By way of example, a first template may include a field in which the user 102 populates with terms, subject matter, item(s), or fields of interest the user 102 would like to locate or annotate within the content 114. The user 102, for example, may enter a term such as "employee name" within the first template. The first template may be provided to the content review service 106 for use in identifying a task (e.g., among the task(s) 136) associated with identifying employee names within the content 114. Upon performing the search of the content 114, the content review service 106 may provide the employee name(s), if any, within the content 114. For example, the content review service 106 may locate an employee name of "John Doe" or "Jane Doe" within the content 114. In some instances, the content review service 106 may provide these results 164 to the user 102 for his or her inspection, along with the corresponding content that includes employee names. For example, a first document of the content may include the employee name "John Doe" and a second document of the content may include the employee name "Jane Doe." Therefore, the request or search requested by the user 102 may surface the employee names within the content 114. Additionally, as part of filing out the first template the user 102 may enter a confidence level(s) associated with the search. For example, the user 102 may request that the content review service 106 transmit reviews to the reviewer 104 when the ML model(s) 126 less than are 90 confident. That is, if the content review service 106 is 90 percent confidence that "John Doe" and "Jane Doe" are employee names, the content review service 106 may not invoke the reviewer 104. Further, as discussed above, the reviewer 104 may review the result(s) before being provided to the user 102, based on for example, the content review service 106 having a confidence below a threshold that "John Doe" and/or "Jane Doe" are employee names.

The template(s) 162 may also be specific to the ML model(s) 126 and based on the content being analyze. For example, a template may be used by the ML model(s) 126 to track an object over multiple frames of video data. Accordingly, the content review service 106 may maintain a template for each of the different types of workflows and for the content being analyzed.

In some instances, the reviewer 104 may populate the template(s) 162 based on the request from the user 102. For example, the user 102 may request that the reviewer 104 search or check the content 114 for inappropriate subject matter and the condition(s) 116. These condition(s) 116 may be supplied to the reviewer 104, who in turn, may utilize the template(s) 162 for searching the content. In this sense, although the condition(s) 116 and the request are supplied to the reviewer 104, the reviewer 104 may create and/or populate the template(s) 162 with the request. The reviewer 104 may therefore utilize his or her knowledge of the best way or most optimum way to search within the content 114, for example, knowing the template(s) 162 usable to search within the content.

The content review service 106 may maintain a database of reviewers or reviewers utilized by the content review service 106 when reviewing content. In some instances, each of the reviewers may be experts or trained within specific fields to identify certain subject matter within the content. For example, a first reviewer may be trained for annotating violent behavior in content, a second reviewer may be trained for identifying offensive language in content, a third reviewer may be trained to identify cancerous cells in content, a fourth reviewer may be trained to label nudity in content, a fifth reviewer may be trained to annotate or identify sports objects in content, and so forth. Each of the reviewers, may, for example, be experts within their respective field and the content review service 106 may pick, or utilize, a respective reviewer when reviewing the content. In some instances, the content review service 106 may select the reviewer 104 based on their field of expertise, the content 114, the request of the user 102, the condition(s) 116, and the confidence of the ML model(s) 126. In some instances, selecting a specific reviewer may assist in accurately fulfilling the request of the user 102 and/or a time in which the reviewer 104 review the content (or the review(s)). Review(s) may therefore route to respective reviewers of the content review service 106. In some instances, any number of reviewers may review the content to determine a consensus or average review when updating the content.

Although the user device 108 and/or the reviewer device 150 are illustrated as certain device (e.g., laptops), in some instances, the user 102 and/or the reviewer 104 may interact with other devices for submitting the requests and reviewing the content, respectively. For example, such devices may alternatively include mobile devices (e.g., phone, tablet, etc.), desktop devices, and so forth.

Accordingly, FIG. 1 illustrates a scenario whereby the user 102 may request certain condition(s) (e.g., the condition(s) 116) associated with reviewing the content 114. In some instances, the user 102 may request, as a condition, that a human reviewer (e.g., the reviewer 104) review the result(s) of the ML model(s) 126 in instances where the ML model(s) 126 is/are not confident in the results above a threshold level. These reviews, as discussed above, may be transmitted to the reviewer 104. The content review service 106 may locate or find, within the content, areas that the content review service 106 wants the reviewer 104 to review. Such review(s) may therefore be triggered in instances where the condition(s) 116 are met. Alternatively, if the condition(s) 116 are not met, then the reviewer 104 may not be provided any reviews.

As used herein, a processor, such as processor(s) 110, the processor(s) 120, and/or the processor(s) 152 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 112, the memory 122, and/or the memory 154 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), computer readable media (CRM), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIG. 2A illustrates example condition(s) associated with reviewing content. In some instances, FIG. 2A may illustrate a scenario 200A in which image content is reviewed based on the condition(s) (e.g., the condition(s) 116). In some instances, users may provide the request and/or generate the condition(s) with which the content review service 106 is to search the content utilizing a DSL. The condition(s) may be particular to the DSL and designed to communicate with the APIs of the content.

In this example, the request specifies a request to label graphic male nudity within content. The condition(s) specify that graphic male nudity is to be labeled if identified with a confidence of 56. That is, if the content review service 106 is 56 percent confident that the objects within the content contain, represent, or include graphic male nudity, the content review service 106 may flag the content for review. For example, upon locating graphic male nudity, the content review service 106 or components thereof, may label the objects within the image. The objects may further be identified within the content using bounding boxes, semantic segmentation, etc.

To locate graphic male nudity, for example, the content review service 106 may utilize one or more template(s) 162 and/or ML model(s) 126 that are trained to identify and/or locate the objects (or fields of interest) corresponding to graphic male nudity. In this sense, the template(s) 162 or a request by the user to locate certain objects or fields of interest within the content may utilize specific ML model(s) 126 that are trained to handle the request of the user.

As also shown, the user may enter a request to more generally locate nudity within the provided content. Here, the user may specify a confidence of 66. As such, the review by the content review service 106 may permit the user to specify the condition(s) associated with each field of interest, or which subject matter of the content the user would like search, analyze, label, and so forth.

Based on the provided condition(s) for the fields of interest, the content review service 106 may review the content and may provide, for review to one or more reviewers, the content (or portions thereof) for review.

FIG. 2B illustrates example condition(s) associated with reviewing content. In some instances, FIG. 2B may illustrate a scenario 200B in which textual content is reviewed based on the condition(s) (e.g., the condition(s) 116). In some instances, users may provide the request and/or generate the condition(s) with which the content review service 106 is to search the content utilizing a DSL. The condition(s) may be particular to the DSL and designed to communicate with the APIs of the content.

In this example, the request specifies a request to locate, find, or search for universities within the content. The user may enter, for example, "university name" as a field of interest. This request specifies that the user is requesting the content review service to locate the names of universities within the textual content and to either return the names of the universities within the content or to other flag the universities within the content. Aliases of the field of the interest may also be provided. The aliases may expand the scope of the search or review conducted by the content review service to locate like or associated names.

FIG. 2B also illustrates that for the returned universities, the user is also requesting their associated state. For example, upon searching the content, the content review service 106 may locate "Stanford" and an associated state "California" or "CA." Such labels may be provided within the content or the results (i.e., the located universities and the state) may be provided to the user.

To locate the fields of interest, for example, the content review service 106 may utilize one or more template(s) 162 and/or ML model(s) 126 that are trained to identify and/or locate the fields of interest. In this sense, the template(s) 162 or a request by the user to locate certain objects or fields of interest within the content may utilize specific ML model(s) that are trained to handle the request of the user.

FIGS. 3-8 illustrate various processes related to reviewing content. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1 and 2, although the processes may be implemented in a wide variety of other environments, architectures, and systems.

Figure 3:
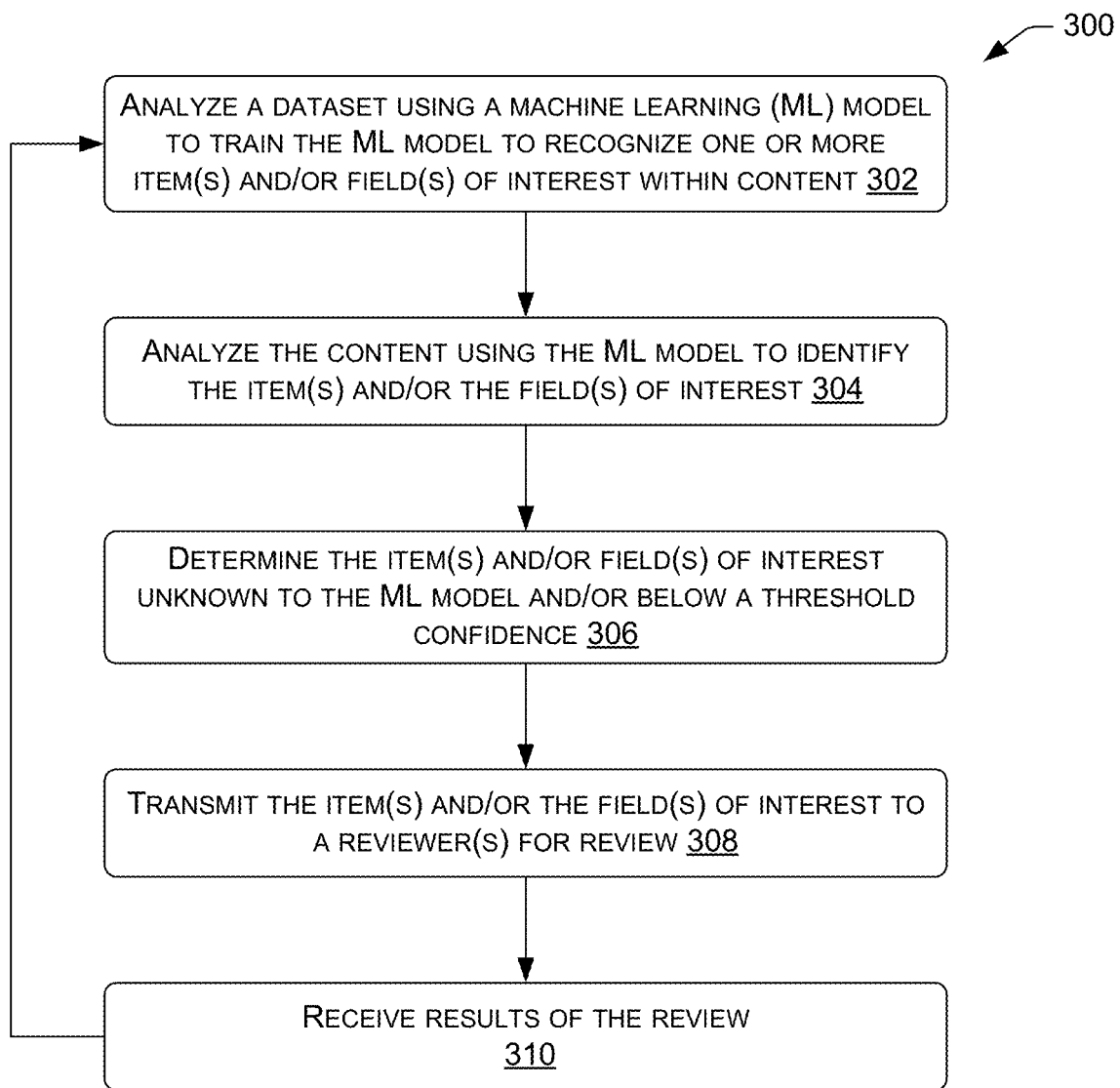
FIG. 3 illustrates an example process for training one or more machine learning model(s), according to an embodiment of the present disclosure.

FIG. 3 illustrates an example process 300 for training a machine learning (ML) model, analyzing content using the ML model, then the retraining the ML model based at least in part on the output of the ML model and reviews of one or more reviewer(s).

At 302, the process 300 may analyze a dataset using a ML model to train the ML model to recognize one or more field(s) of interest or item(s) within content. For example, the dataset may include various forms of content, such as documents, PDFs, images, videos, and so forth that are searchable by the ML model. The ML model may be instructed to analyze the dataset or to be trained on the dataset, or content within the dataset, for use in recognizing or searching for item(s) within content at later instances. In some instances, human reviewers may label or classify samples within the dataset (e.g., a calibration set) and the ML model may accept these as input these as inputs for training the ML model. For example, the ML model may be trained to identify certain objects within the content, such as dogs or cats. That is, utilizing the dataset and/or the labels provided by human reviews, the ML models may be trained to recognize or identify dogs or cats with presented content.

At 304, the process 300 may analyze the content using the ML model. For example, after training the ML model, the ML model may accept, as an input, the content or may otherwise analyze user provided content for analysis. Such analysis may determine whether the field(s) of interest or item(s) are present. For example, the ML model may determine whether the content contains any cats or dogs.

At 306, the process 300 may determine item(s) in the content unknown to the ML model and/or which are below a threshold confidence. For example, in analyzing the content, the ML model may identify item(s) that are unknown to the ML model and/or which the ML model does not have a threshold confidence. By way of example, the ML model may be unable to determine whether the item(s) in the content are cats or dogs, or another animal. This result, for example, may indicate that the ML model does not know whether the item(s) are cats or dogs. Additionally, or alternatively, the ML model may not have a threshold confidence that the identified item(s) are cats or dogs. In this sense, and in searching the content, the ML model may determine (1) item(s) corresponding to cats or dogs above the threshold confidence, (2) item(s) corresponding to cats or dogs below the threshold confidence, and/or (3) ambiguous item(s) within the content that may or may not be cats or dogs.

At 308, the process 300 may transmit the item(s) to a reviewer for review. For example, those item(s) that the ML model was unable to identify, or identified below a threshold confidence, may be sent to a reviewer for review. The reviewer may review the item(s) and verify that the item(s) are the predicted output of the ML model and/or may adjust the item(s). For example, the reviewer may confirm that the item(s) are cats or dogs, deny that the item(s) are cats or dogs, and/or may identify item(s) not surfaced by the ML model but which represent cats or dogs.

At 310, the process 300 may receive the results of the review associated with the item(s). For example, the ML model may receive an indication indicating that the determined item(s) as output or predicted by the ML model(s) where cats or dogs.

From 310, the process 300 may loop to 302, whereby the ML model may be retrained using the results of the review. At 302, the ML model may constantly be retrained based on the review and results provided by the reviewer. For example, previously classified or unclassified images may be provided to one or more experts for classification. The experts may provide their own classification, which may be used to either confirm or change an original classification. The ML models may be retrained based on the updated classifications to further improve accuracy of the ML model(s). The iterative process of the ML model outputting item(s) that the ML model has a low confidence, the ML model may receive reviews for increasing an accuracy and quality of the ML model. Herein, the human reviewer may avoid annotating, correcting, or labeling those item(s) that the ML model is confident in, or has predicted with high certainty, to save costs and time of the human reviewer. Accordingly, when new images are inferred, for example, the most up-to-date threshold may determine if human review is needed.

In some instances, the reviews performed by the reviewer may be used to update the confidence associated with the ML model. For example, if the results provided by the reviewer match the results (or prediction) of the ML model(s), the confidence of the ML model(s) may be increased. Such increase may represent that the accuracy of the ML model(s), respectively. Moreover, in some instances, the reviews may be performed by multiple reviewer(s). For example, multiple reviewers may review the same item(s) and/or content, or multiple reviewers may be asked whether the content contains certain item(s), subject matter, and so forth. Based on an agreement and consistency over time, or whether the reviewers agree (e.g., reviews indicating the same results), the process 300 may determine the accuracy of certain reviewers. This accuracy, or results of the reviewers, may be used to generate model(s) indicative of the accuracy of the reviewer. The similarly between reviewers and/or the accuracy of the reviewers may be used to determine a confidence of the ML model(s) and/or the confidence of the results of the ML model(s).

Figure 4:
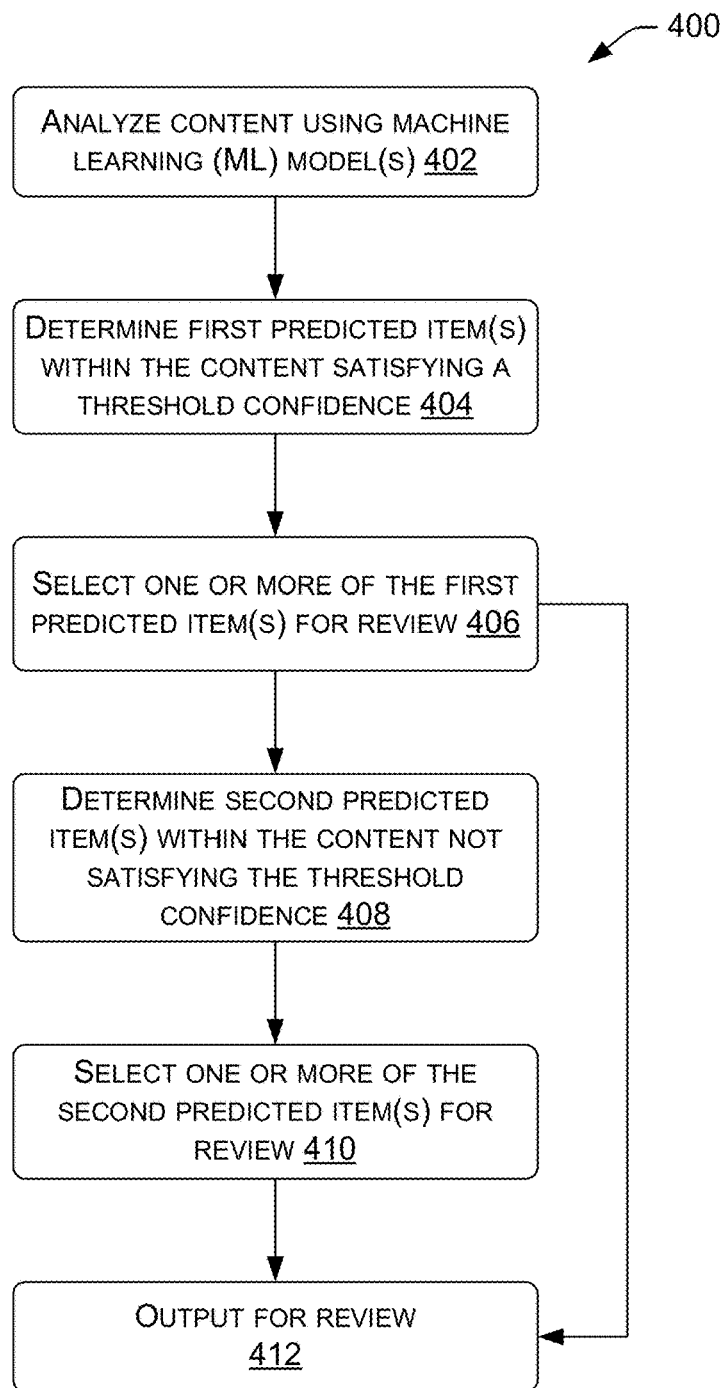
FIG. 4 illustrates an example process for determining review(s), according to an embodiment of the present disclosure.

FIG. 4 illustrates an example process 400 associated with auditing or inspecting the quality of the outputs of ML model(s).

At 402, the process 400 may analyze content using a ML model. For example, a user may request that content be analyzed to identify birthdays. In some instances, the ML model may be previously trained to identify birthdays in the content (e.g., pamphlets, forms, PDFs, etc.) of the user, or as provided by the user.

At 404, the process 400 may determine first predicted item(s) within the content satisfying a threshold confidence. For example, in analyzing the content, the ML model(s) may determine first item(s) or fields of interest within the content corresponding to birthdays. To locate or otherwise determine that the fields of interest correspond to birthdays, one or more ML model(s) may be utilized. In some instances, the first item(s) as determined by the ML model may have a confidence that satisfy a threshold confidence. That is, the ML model may confidently determine, above the threshold confidence, that the first item(s) are birthdays.

At 406, the process 400 may select one or more of the first predicted item(s) for review. For example, despite the ML model(s) having a confidence that the first predicted item(s) correspond to birthdays, the process 400 may select one or more of the first predicted item(s) for review to ensure a quality or otherwise audit the ML model. Such process may therefore attempt to confirm the accuracy of the ML model or that the first predicted item(s) of the ML models are actually birthdays.

From 406, the process 400 may proceed to 408 whereby the one or more first predicted item(s) may be output for review by one or more reviewer(s). The review may verify, deny, or adjust the one or more first predicted item(s) as corresponding to birthdays, for example.

Additionally, or alternatively, from 406 the process 400 may proceed to 410 whereby the process 400 may determine second predicted fields of interest or item(s) within the content not satisfying the threshold confidence. For example, in analyzing the content, the ML model may be unsure whether one or more item(s) within the content are birthdays. Such item(s) may be recognized, but the ML model may not be confident enough that the item(s) are birthdays. Additionally, the second predicted item(s) may be ambiguous items that are unable to be discerned by the ML model(s).

At 412, the process 400 may select one or more of the second predicted item(s) for review. For example, as the ML model does not have a confidence that the second predicted item(s) correspond to birthdays, the process 400 may select one or more of the second predicted item(s) for review to confirm that the one or more second predicted item(s) are not birthdays or adjust (e.g., label) the one or more second predicted item(s) as birthdays. Such process may therefore attempt to confirm the accuracy of the ML model (e.g., that the second predicted item(s) are not birthdays) or that the second predicted item(s) of the ML models are actually birthdays.

From 412, the process 400 may proceed to 408 whereby the one or more second predicted item(s) are output for review. Accordingly, at 408, the process 400 may receive, in some instances, both the one or more first predicted item(s) and/or the one or more second predicted item(s) for use in confirming the accuracy of the ML model or updating the accuracy of the ML model through retraining. For example, some percentage of all the content (e.g., five, ten, etc.) may be sent for review without condition(s). There, the reviewers may be invoked to confirm that the ML model(s) are accurately predicting the objects to prevent data drift. In some instances, the audit to be performed by the review may include asking the reviewer to confirm the object, or may open-endedly ask the reviewer to label or annotate objects.

Additionally, as part of auditing the ML model(s), the results of the ML model(s) may be compared between reviewers. For example, the review of a first reviewer may be compared against the review of a second reviewer. Here, in instances where the ML model(s) perform multiple task(s), or multiple ML models are used to perform the task(s), the results of each ML model, respectively, may be checked for accuracy during the audit. By checking the accuracy of the ML model(s) between tasks and assigning the review(s) to multiple reviewers, the accuracy of the ML model(s) may be increased.

Additionally, in some instances, the content may be audited based on the confidences satisfying or not satisfying the threshold. For example, in instances where item(s) are unable to be located within the content, the content may otherwise be checked to determine whether the content contains the item(s) or to confirm that the content does not contain the item(s). A random sampling of content may be supplied for auditing to ensure the accuracy of the ML model(s). That is, even in instances where the ML model(s) do not predict or locate the item(s) within the content, the content may be output for review by the reviewer.

Figure 5A:
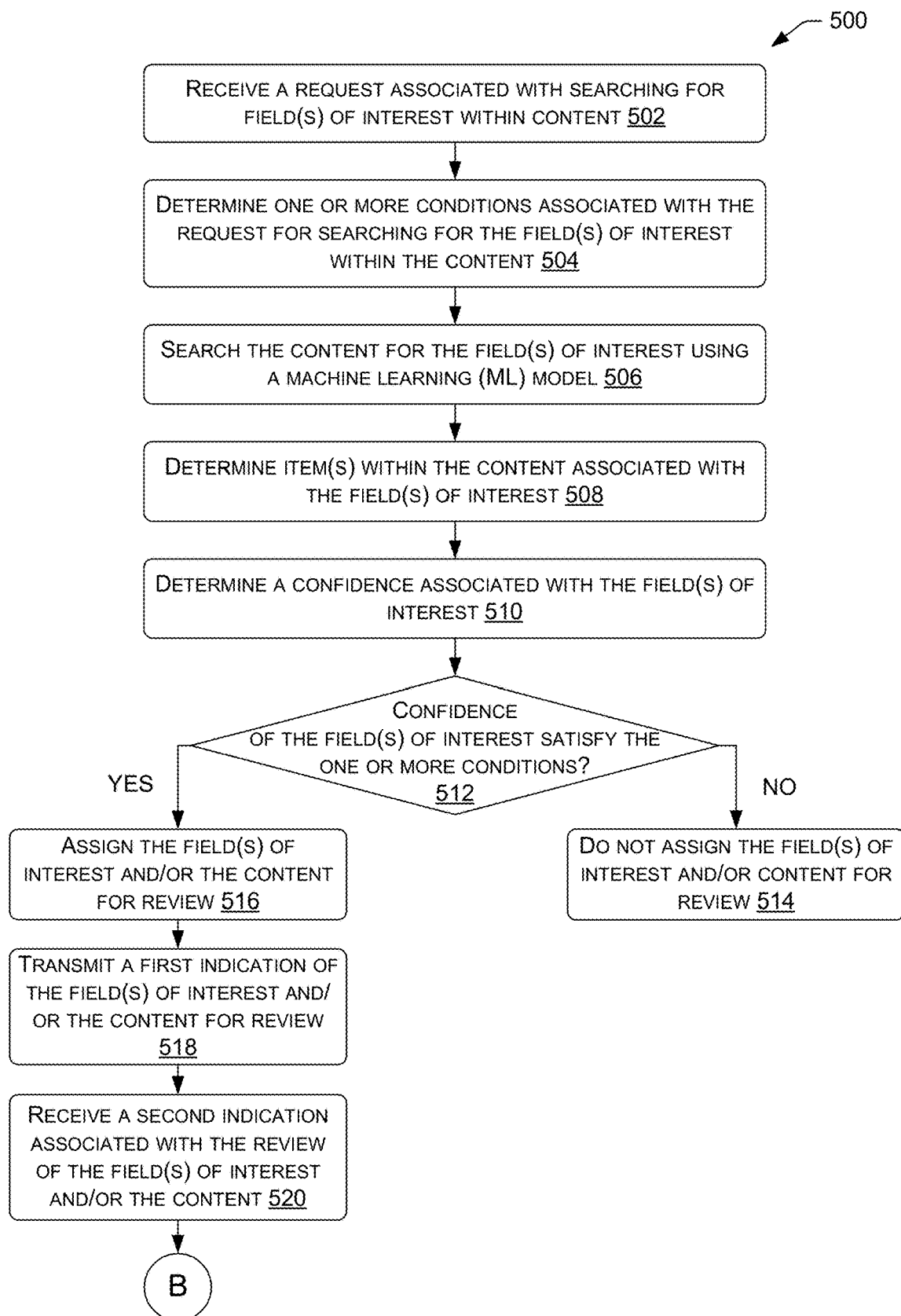
FIGS. 5A and 5B illustrate an example process for determining review(s) based on one or more condition(s), according to an embodiment of the present disclosure.
Figure 5B:
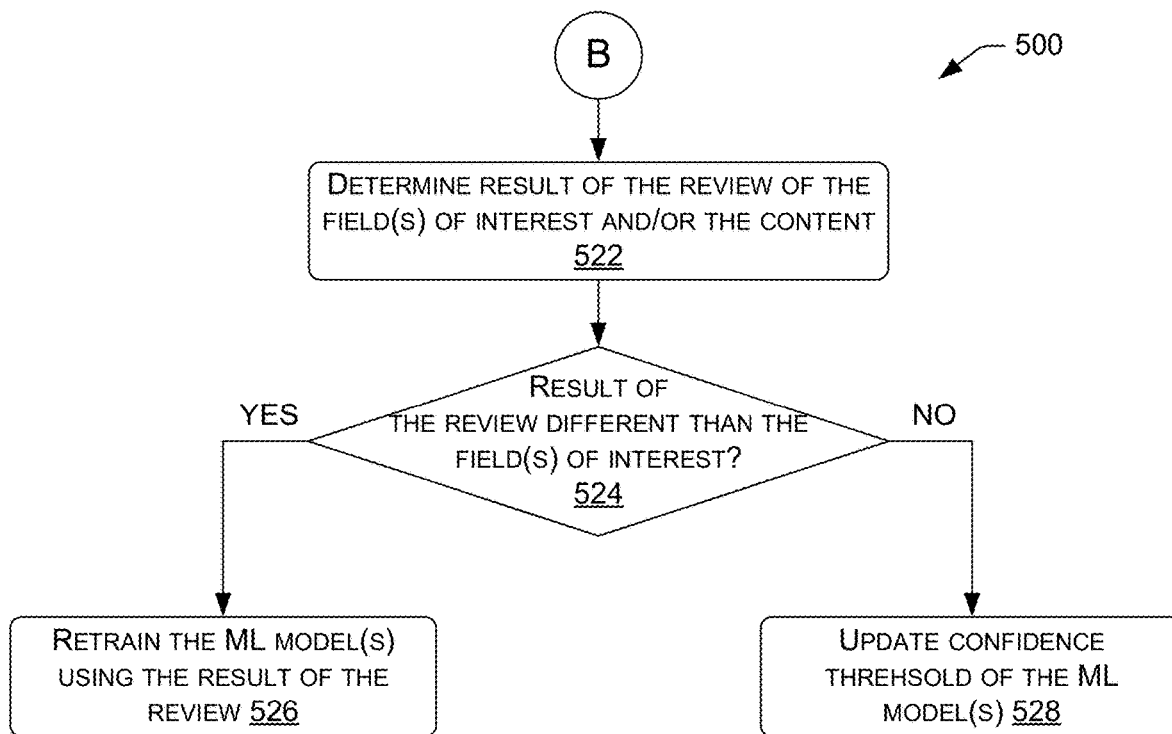

FIGS. 5A and 5B illustrate an example process 500 for determining conditions associated with reviewing content and determining instances to review fields of interest within the content.

At 502, the process 500 may receive a request associated with searching for a field of interest within content. For example, a user may provide or submit a request associated with searching or reviewing content to determine potential fields of interest. In some instances, the field of interest may include determining whether the content contains particular words, phrases, images, objects, characters, and so forth. By way of one example, the request may represent a request to identify stop signs within images. In some instances, the request may be provided by a user requesting the search associated with the field of interest. Users may, for example, input or enter the request utilizing a DSL for searching content of the user.

At 504, the process 500 may determine one or more conditions associated with the request for searching for the field of interest. For example, as part of processing the request, the process 500 may determine conditions pertaining to the search. The conditions may, in some instances, be supplied by the user issuing the request. For example, the user may input a condition for stop signs to be accurately identified 95 percent of the time within the content. In some instances, this accuracy may be associated with which ML models the process 500 uses to search the content and/or the workflows associated with searching the content for the field of interest. For example, users may specify and/or limit the amount of human interaction or review of the content based on the provided condition(s). Conditions may also specify characteristics of the outputs of the ML model predictions and/or what is ultimately presented to the user after the search is conducted.

At 506, the process 500 may search the content for the field of interest using a ML model(s). For example, the ML model(s) may utilize various forms of text extraction, content recognition, box bounding, semantic segmentation, etc. for analyzing the content. In some instances, the content may include, or represent, various forms of content or documents including images, text, tables, equations, and so forth. Additionally, or alternatively, the content may represent an assembly of content (e.g., multiple images) or individual images stored in separated locations. Continuing with the above example, the ML model(s) may analyze various images to determine whether any of the images contain representations or depictions of stop signs. As discussed above, the ML model(s) may be previously trained and configured to analyze the content to recognize the field of interest. In some instances, each ML model may correspond, or be trained to, recognize objects, phrases, words, and so forth within the content. Identifying the field(s) of interest may also be determined using multiple ML model(s), whereby a first ML model may identify the field of interest and a second ML model may determine content within the field of interest.

For example, at 508, the process 500 may determine item(s) within the content that are associated with the field of interest. In searching the content, the ML model(s) may identify items within the content as corresponding to the field of interest. In this sense, the ML model(s) may predict areas, or item(s), within the content as being associated with or corresponding to the field of interest. The ML model(s) may identify area(s) within the images or item(s) within the image that the ML model(s) determined correspond to the field of interest.

At 510, the process 500 may determine a confidence associated with the item(s). For example, after recognizing or predicting the item(s) as corresponding to the field of interest, the process 500 may determine an associated confidence of the determination. The confidence may represent, in some instances, how confident the ML model(s) is/are that the item(s) correspond to the field of interest. For example, the item(s) as predicted by the ML model(s) as corresponding to stop signs may be associated with a confidence (e.g., 80 percent confident the item is a stop sign, 90 percent confident the item is a stop sign, and so forth). As discussed above, the confidence of the ML model(s) may be determined via the ML model(s) being trained from a dataset to recognize stop signs. Each of the ML model(s) may therefore include a corresponding confidence that represents an accuracy of the ML model to identify the field(s) of interest.

At 512, the process 500 may determine whether the confidence of the item(s) satisfying the one or more condition(s). For example, the process 500 may determine whether the confidence is greater than a threshold, which may be set by the user at 504. In some instances, the threshold may be determined using a calibration set and stateful calibrated non-adaptive or stateful calibrated adaptive techniques. The condition(s) may also indicate a range of confidences that trigger human review. For example, confidences between 0.25 and 0.7 is sent may be sent for human review. Here, the confidence of the item(s) as determined at 510 may be compared against the threshold to determine whether the confidence is greater than, equal to, or less than the threshold. In some instances, if the confidence is greater than the threshold, the process 500 may determine that the item(s) represent or correspond to the field of interest. Alternatively, if the process 500 determine(s) that the confidence is less than the threshold, the process 500 may be inconclusive about determining that the item(s) represent the fields of interest or may have low confidence that the item(s) represent the fields of interest. If at 512, the process 500 determines that the confidence does not satisfy the one or more condition(s), the process 500 may follow the "NO" route and proceed to 514.

At 514, the process 500 may not assign the item(s) and/or the content for review. For example, based at least in part on determining that the confidence satisfies the one or more condition(s), the process 500 may be confident that the item(s) represent or correspond to the fields of interest. In this sense, the search of the content may not satisfy the condition(s) for invoking human review of the content. For instance, the process 500 may be confident, above the threshold confidence, that the item(s) represent stop signs.

Alternatively, if at 512, the process 500 determines that the confidence does not satisfy the one or more conditions (e.g., the confidence is not greater than the threshold), the process 500 may follow the "YES" route and proceed to 516. At 516, the process 500 may assign the item(s) and/or the content for review. For example, based at least in part on determining that the confidence is not greater than the threshold, the process 500 may not be confident, or may not be sure, that the item(s) represent or correspond to the fields of interest. In this sense, the condition(s) associated with invoking human review may be satisfied. For instance, the process 500 may not be confident, above the threshold amount, that the item(s) represent stop signs. In some instances, the process 500 may flow to 516 in instances where the ML model is unable to identify objects or item(s) within the content. For example, the content may include an ambiguous item that the ML model(s) may be unable to discern or recognize.

At 518, the process 500 may transmit a first indication of the item(s) and/or the content for review. For example, the first indication may represent which item(s) in the content, or which areas of the content, the reviewer is to review. In some instances, the review may include the reviewer verifying that the item(s) is/are not the fields of interest or that the content does not contain the field of interest. For example, the reviewer may confirm that the item(s) is not a stop sign and/or that the content does not contain a stop sign. In some instances, additionally or alternatively, the reviewer may adjust labels associated with the items. For example, if the reviewer is prompted to confirm that the item(s) is a stop sign, but the item(s) is not actually a stop sign, the reviewer may instead label the item as a billboard or yield sign, for example. Here, this review may relabel or readjust the labels of the item(s).

At 520, the process 500 may receive a second indication associated with the review of the item(s) and/or the content. For example, based on the review, the process 500 may receive information associated with the review and which indicates the review performed. Continuing with the above example, the second indication may indicate that the reviewer verified the item(s) as stop signs, confirmed that item(s) were not item(s) were not stop signs, confirm that no stop signs were present in the item(s) and/or content, adjusted a label of the item(s) that were labeled as stop signs, and so forth.

From 520, the process 500 may proceed to "B" as discussed in FIG. 5B. As shown in FIG. FB, from "B" the process 500 may proceed to 522. At 522, the process 500 may determine the result of the review. For example, the process 500 may determine whether the reviewer confirmed the item(s), adjusted a label of the item(s), and so forth. That is, at 522, the process 500 may determine whether the reviewer confirmed that the item(s) and/or the content contained stop signs.

At 524, the process 500 may determine whether the result of the review is different than the item(s) within the content associated with the field of interest. For example, the process 500 may predict that the item(s) are stop signs but the review may indicate that the item(s) are not stop signs. Additionally, the reviewer may identify a stop sign within the content that was unidentified by the ML model(s) during the search of the content. Accordingly, the process 500 at 524 may compare the predictions or the results of the ML model(s) with the review. If at 524, the process 500 determines that the result is different than the predicted item(s), the process 500 may follow the "YES" route and proceed to 526.

At 526, the process 500 may retrain the ML model(s) using the result of the review. For example, the result may be utilized to indicate to the ML model(s) that certain item(s) within the content were unidentified by the ML model(s) during the search of the content. The ML model(s) may therefore be retrained to identify, in future instances, the item(s) at increased accuracies. That is, using the result of the review, or the portions of the content containing the item(s), the ML model(s) may be retrained to more accurately identify the item(s) in future instances. For example, the review may indicate a stop sign within the content and the ML model(s) may be retrained based on identification of the stop sign within the content.

Alternatively, if at 524 the process 500 determines that the result is not different than the item(s), the process 500 may follow the "NO" route and proceed to 528. At 528, the process 500 may update a confidence threshold of the ML model(s). For example, the ML model(s) may determine the predicted item(s) and the review may indicate that the ML model(s) correctly identified the item(s). In this sense, the review may confirm the result of the ML model(s). In such instances, the confidence threshold of the ML model(s), or the confidence of the ML model(s) to identify the item(s), may be increased. By increasing the confidence of the ML model(s), the confidence associated with the model(s) correctly identifying the item(s) within the content may be correspondingly increased.

Although the process 500 is discussed above with regard to search for a single field of interest within the content, in some instances, the process 500 may search for multiple fields of interest within the content. For example, in addition to identifying stop signs within the content, the process 500 may simultaneously search the content for other items, such as street signs or cars. In such instances, the process 500 may utilize one or more additional ML model(s) to identify the other fields of interest. Accordingly, the process 500 may perform several searches in parallel to identify fields of interest.

Furthermore, although the process 500 is discussed and mentioned with regard to searching content, such as images, for fields of interest, the process 500 may search other content as well. For example, envision that a user wants to search invoices for company names. The process 500 may search the content to identify the key (e.g., company name) and return corresponding values (e.g., Company A, Company B, and so forth). Therein, the process 500 may surface item(s) for review if the ML model(s) that identify the key value pairs have a confidence lower than a certain threshold, or other user-defined criteria or conditions. Therein, such items may be sent for review to confirm or correct the predictions of the ML model(s).

Figure 6:
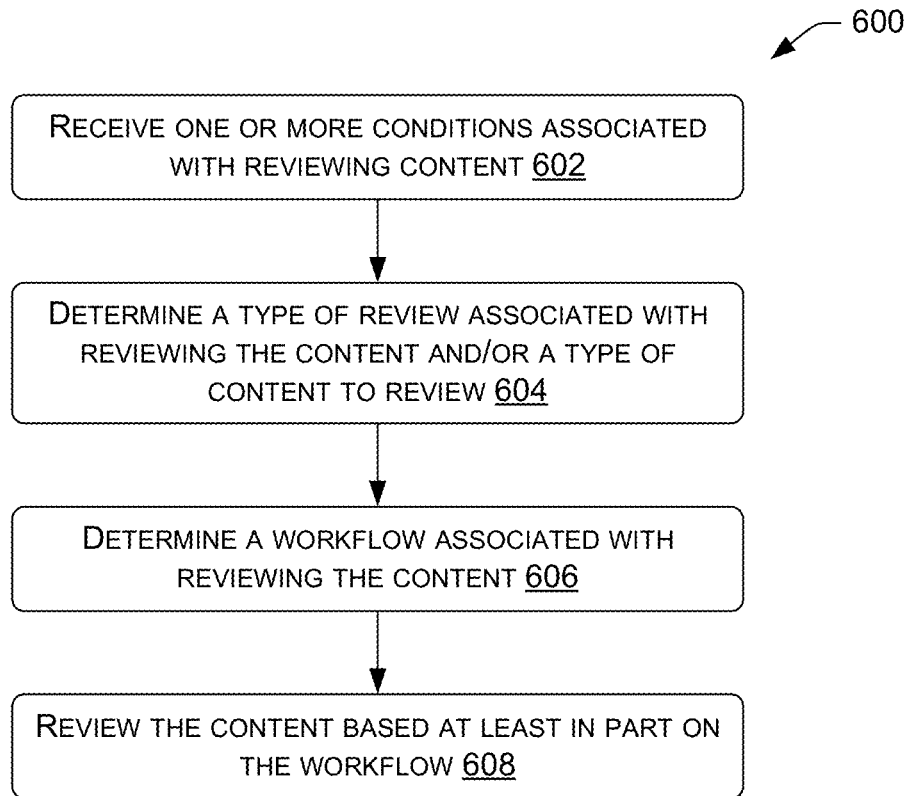
FIG. 6 illustrates an example process for determining a workflow associated with reviewing content, according to an embodiment of the present disclosure.

FIG. 6 illustrates an example process 600 for predicting outputs using workflows as applied to the ML models and/or human reviews. In some instances, the workflows may represent a series of steps or operations that the ML models and human reviews are collectively, or individually, configured to perform.

At 602, the process 600 may receive one or more conditions associated with reviewing content. For example, a user may input instructions, criteria, parameters, or other conditions associated with reviewing the content. By way of example, the conditions may include predicting outputs at 95 percent confidence. For example, if the predicted outputs as determined by the ML models are less than 95 percent, the user may request additional review by human reviewers. In some instances, the user may input or define the conditions using a DSL to allow the user to script the conditions. These conditions are then combined with logic utilize by the ML model to express a semantic meaning to indicate when human review is warranted (e.g., when the user desires human review if under a certain confidence).

At 604, the process 600 may determine a type of review to associated with reviewing the content and or a type of review. For example, the user may request that certain key value pairs be identified within the content. Here, the process 600, upon knowing the type of review may select corresponding ML model(s) to perform the review and/or tasks performable by the ML model(s). For example, if the user wants to review content that contains email address, or locate email addresses within the content, the process 600 may select ML model(s) trained for detecting or searching for email addresses within the content. Additionally, or alternatively, the ML model(s) may be specific or trained to detect the email address within various forms of content. For example, the ML model(s) may be specific to detecting email addresses within text and/or images.

At 606, the process 600 may determine a workflow associated with reviewing the content. For example, knowing the one or more conditions as specified by the user, and/or a task (or review) requested by the user, the process 600 may determine operations or a workflow for reviewing the content. In some instances, the workflow may represent a series of steps performable by the ML models(s) and/or human reviewers, respectively. For example, depending on the content to be reviewed or the type of review, workflows may be different and/or a different order of operations between the ML model(s) and human reviewers may be invoked. By way of example, a workflow associated with reviewing content to identify email addresses may be different than a workflow associated with reviewing content to identify mailing addresses or object recognition in text or images.

In some instances, and as noted above, the workflow may identify operations performed by ML model(s) and operations performed by human reviewers. For example, a workflow may specify that the ML model(s) and the human reviewers are to both confirm the presence of an email address in a particular piece of content. Additionally, or alternatively, the workflow may specify that certain predictions are to be checked or confirmed by human reviewers and/or that conclusions of the human reviewers are to be checked or confirmed by ML model(s). In some instances, the workflow may include any order, or different combination, or human reviewers confirming the predictions of ML models and/or the ML model(s) confirming the results of the ML models. By way of another example, for image classification, both the predicted output of the ML model(s) and the review of the human may have to indicate that the image contains a fox before the image is classified as containing a fox. In this sense, and as noted above, each ML model may be trained on datasets and proven workflows corresponding to their associated reviews, tasks, or function.

At 608, the process 600 may review the content based at least in part on the workflow. For example, using the workflow, the content may be reviewed to determine the content or item(s) within the content satisfy the one or more conditions. Continuing with the above example, the process 600 may analyze the content to determine the presence and location of email address(es) if any, within the content.

Figure 7:
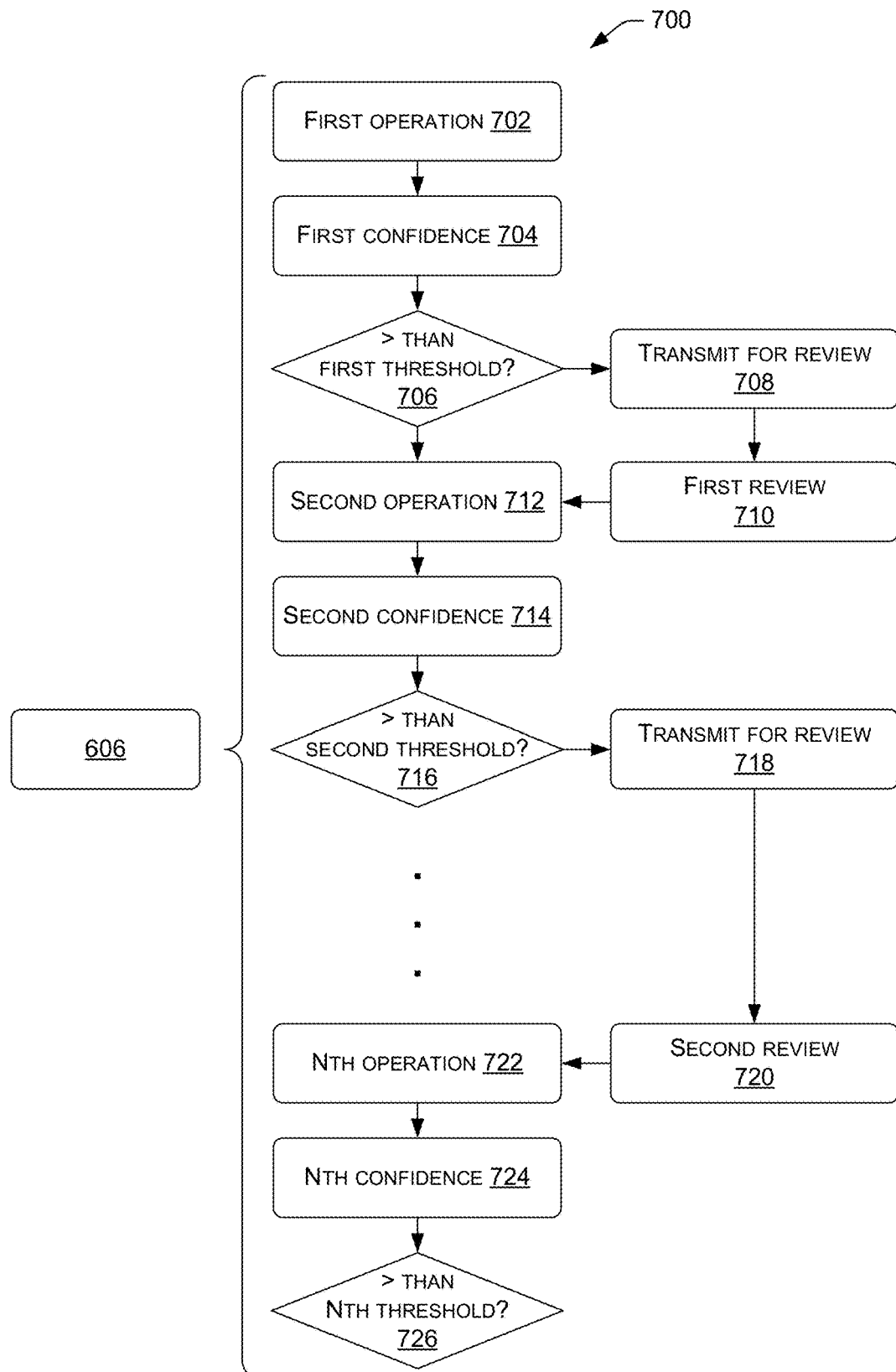
FIG. 7 illustrates an example workflow for a review, according to an embodiment of the present disclosure.

FIG. 7 illustrates additional details of the operation 606 of FIG. 6 and the process 600 for determining a workflow associated with reviewing content. As shown, the workflow 606 may include or be associated with a process 700.

In some instances, the workflow 606 may include a first operation 702. For example, the first operation 702 may include determining whether content contains explicit material. In some instances, determining whether the content contains explicit material may include utilizing image classification, bounding boxes, semantic segmentation, or text extracting via one or more ML model(s). For example, if the content contains explicit material, a bounding box may be drawn around the area(s) within the content containing explicit material. Such flagging, or identification of explicit material, may be utilized when screening or posting the content to forums, websites, blogs, or other forms of social media. For example, social media cites may include policies that limit the use or presentation of explicit material. If the first operation 702 does not recognize or determine that the content contains explicit material, then bounding boxes may not be drawn around areas within the content. In some instances, the first operation 702 may be performed by a human or one or more ML model(s).

After performing the first operation 702, the process 700 may include determining a first confidence 704 associated with the first operation 702. For example, the ML model(s) may determine a confidence that the content does not include or contain explicit material. In some instances, if a reviewer performs the first operation, the input or answer to the first operation 702, may be treated as the ground truth or that the content does not contain explicit material.

At 706, the process 700 may determine whether the first confidence is greater than a first threshold. For example, the process 700 may compare the first confidence with the first threshold to determine whether the first confidence is greater than or less than the first threshold. In some instances, the first threshold may be set, or determined by the user requesting the review, or may be a default and/or continuously trained threshold associated with the workflow. If at 706, the process determines that the first confidence 704 is not greater than the first threshold, the process 700 may follow the "NO" route and proceed to 708. For example, the ML model may output a first confidence 704 of 85 percent that the content does not content contain explicit material. However, the first threshold may include a confidence of 95 percent, meaning that if the first confidence 704 is not above the first threshold, the process 700 is not confident enough that the content does not contain explicit material.

Accordingly, at 708 the content may be transmitted for review. In some instances, the review may flag or identify those portions or areas within the content that include the first confidence 704 that is less than the first threshold. Such indications may serve to reduce an amount of review time or pinpoint the review to a specific area of the content. In some instances, the area or the content may be accentuated for ease in locating. In some instances, the review at 708 may be conducted by one or more additional ML model(s) and/or human reviewers.

At 710, the process 700 may receive a first review of the content. In some instances, the first review may include a verification of the first operation 702 or a predicted output of the first operation 702. Alternatively, the first review may include an adjustment of the first operation 702 or the predicted output of the first operation. For example, the review may deselect or remove a bounding box around an area of the content as determined by the first operation 702 as corresponding to explicit content. Additionally, or alternatively, the review may identify a missed area within the content that contains explicit material. Such verification and/or adjustment may be used to update the accuracies and confidence thresholds associated with the first operation 702. For example, if the ML model accurately determines that the content contains explicit material, the accuracy of the model may be updated. Alternatively, if the ML model does not accurately identify the content, the ML model may be retained. For example, the first review may be performed by a human reviewer and the results of the human review may be utilized by the process 700 to retrain the ML model(s).

After 710, the process 700 may proceed a second operation 712 that is associated with the workflow. The second operation 712 is discussed in detail herein.

At 706, if the process 700 determines that the first confidence 704 is greater than the first threshold, the process 700 may follow the "YES" route and proceed to the second operation 712. Here, determining that the first confidence 704 is greater than the first threshold may indicate that the first operation 702 or the predicted output of the first operation 702 is greater than the first threshold. For example, the ML model may be 98 percent confident that the content does not contain explicit material, which is greater than the first threshold of 95 percent.

The second operation 712 may include determining whether all of the explicit material within the content is identified or within a bounding box. In some instances, the second operation 712 may include different techniques for identifying whether all of the explicit material within the content (e.g., image classification, bounding boxes, semantic segmentation, or text extracting). Additionally, or alternatively, in instances where the first operation 702 is performed by ML model, the second operation 712 may be performed by a human reviewer or a different ML model. Regardless, the second operation 712 may further serve to identify explicit material within the content or otherwise confirm or correct the results of the first operation 702. For example, the second operation 712 may determine that all the explicit material within the content includes a bounding box or that not all explicit material includes bounding boxes. For the latter, the process 700 may draw a bounding box around the area(s) within the content containing explicit material.

After performing the second operation 712, the process 700 may include determining a second confidence 714 associated with the second operation 712. For example, the ML model(s) or the reviewer may determine a confidence that the content does not include or contain explicit material.

At 716, the process 700 may determine whether the second confidence is greater than a second threshold. In some instances, the second threshold may be greater than, equal to, or less than the first threshold. For example, the process 700 may compare the second confidence with the second threshold to determine whether the second confidence is greater than or less than the second threshold. In some instances, the second threshold may be set, or determined by the user requesting the review, or may be a default and/or continuously trained threshold associated with the workflow.

If at 716, the process 700 determines that the second confidence 714 is not greater than the second threshold, the process 700 may follow the "NO" route and proceed to 718. For example, the ML model may output a second confidence 716 of 90 percent that the content does not content contain explicit material. However, the second threshold may include a confidence of 93 percent, meaning that if the second confidence 714 is not above the second threshold and the process 700 is not confident enough that the content does not contain explicit material. Accordingly, at 718 the content may be transmitted for review. In some instances, the review may flag or identify those portions or areas within the content that include the second confidence 714 that is less than the second threshold. Such indications may serve to reduce an amount of review time or pinpoint the review to a specific area of the content. In some instances, the area or the content may be accentuated for ease in locating. In some instances, the review at 718 may be conducted by one or more additional ML model(s) and/or human reviewers.

At 720, the process 700 may receive a second review of the content. In some instances, the second review may include a verification of the second operation at 712 or a predicted output of the second operation at 712. Alternatively, the second review may include an adjustment of the second operation at 712 or the predicted output of the second operation. For example, the second review may deselect or remove a bounding box around an area of the content as determined by the second operation at 712 as corresponding to explicit content. Additionally, or alternatively, the second review may identify a missed area within the content that contains explicit material. Such verification and/or adjustment may be used to update the accuracies and confidence thresholds associated with the second operation. For example, if the ML model accurately determines that the content contains explicit material, the accuracy of the model may be updated. Alternatively, if the ML model does not accurately identify the content, the ML model may be retained. For example, the second review may be performed by a human reviewer and the results of the human review may be utilized by the process to retrain the ML model(s).

After 720, the process 700 may proceed an nth operation 722 that is associated with the workflow. Further, if the process 700 determines that the second confidence at 714 is greater than the second threshold, the process 700 may follow the "YES" route and proceed to the nth operation at 722. Here, determining that the second confidence is greater than the second threshold may indicate that the second operation at 712 or the predicted output of the second operation at 702 is greater than the second threshold. In some instances, the nth operation may include additional operations for determining whether all of the content associated with the one or more conditions has been identified.

For example, the process 700 may determine whether all of the explicit material within the content has been identified.

From 722, the process 700 may proceed to 724 to determine a nth confidence associated with the nth operation. Therein, at 726, the process 700 may determine whether the nth confidence is greater than an nth threshold for potentially invoking one or more additional operations, reviews. Alternatively, the process 700 after determining that the second confidence is greater than the second threshold may end and conclude that the content does not contain any items corresponding to the one or more conditions. For example, after satisfying the second threshold, the process 700 may terminate and conclude that the content does not contain explicit material. In some instances, the process 700 may also terminate after 726.

In some instances, FIG. 7 and the process 700 may illustrate a scenario whereby confidences are determined between each stages or operations within an overall workflow. Determining the confidences between each stage may serve as a source for error checking and retraining the ML models. For example, if the process 700 frequently (or over a predetermined amount of time) determines that the first confidence is less than the first threshold, the process 700 may retrain ML model(s), update a training dataset, invoke human reviewers, and so forth. The quality or accuracy of the workflow may therefore be monitored and updated. Furthermore, as shown, the predictions or results of the operations in the 700 may flow or continue to subsequent operations for further analysis or review. Herein, the process 700 may route information between the operations and ensure data compatibility between each operation of the process 700. In doing so, the predictions and/or outputs of the operations may be checked for quality before being pass onto subsequent operations in the process 700.

Accordingly, the multi-step process as illustrated in FIG. 7 may check an agreement at each step. In doing so, more data may be collected before moving on or proceeding to subsequent operations. Between each step the results (or predictions of the human reviews and/or ML model(s)) may be compared to determine variances). This comparison may be lead to higher quality ML model outputs.

Figure 8:
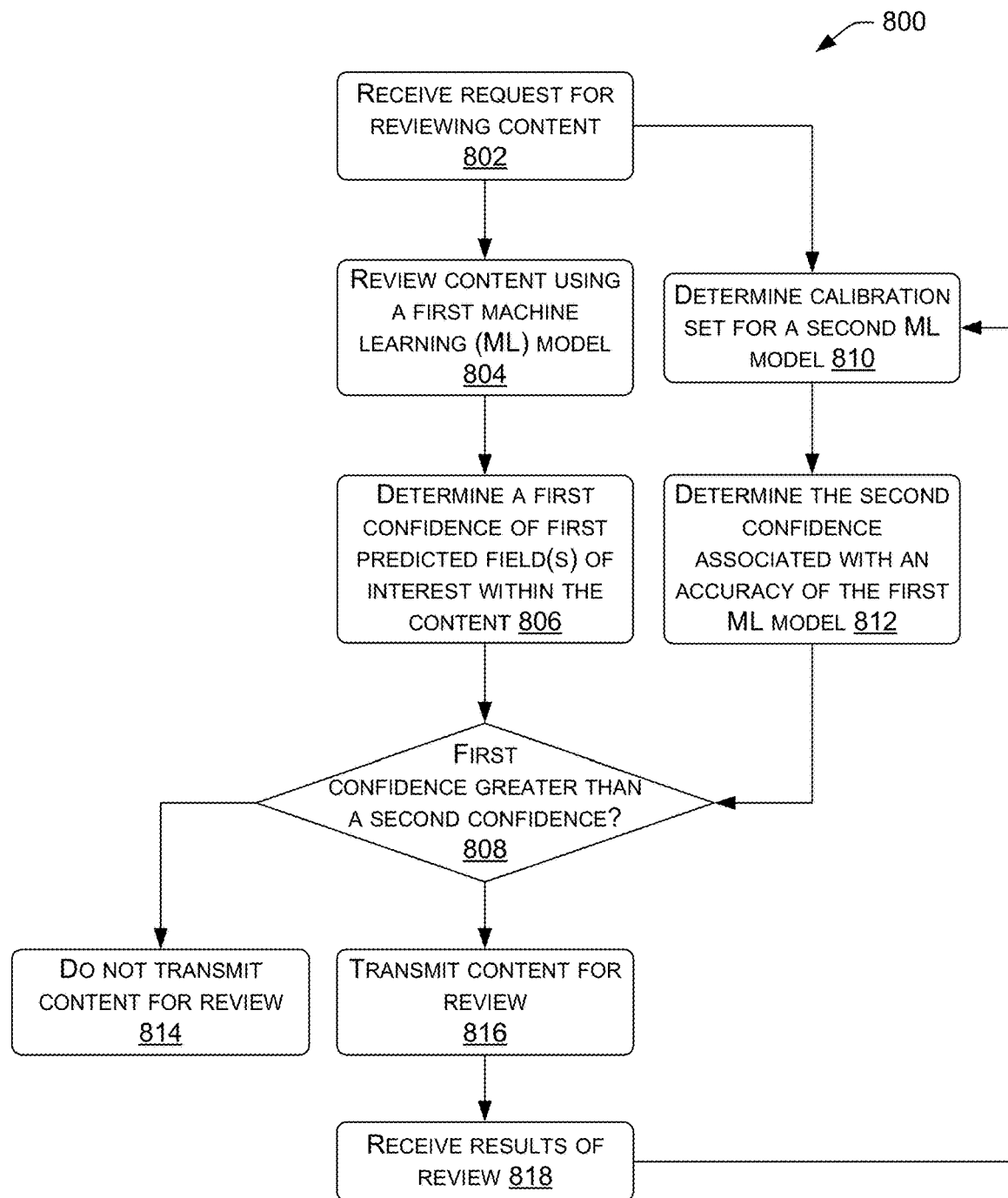
FIG. 8 illustrates an example process for updating a calibration set for machine learning model(s), according to an embodiment of the present disclosure.

FIG. 8 illustrates an example process 800 for updating thresholds for reviewing content. At 802, the process 800 may receive a request for reviewing content. For example, the user may submit a request for reviewing content. In some instances, the request may include the content to be reviewed and/or the conditions associated with reviewing the content (e.g., confidence thresholds).

At 804, the process 800 may review the content using a first machine learning (ML) model. For example, the first ML model may be trained to identify field(s) of interest (e.g., objects, key value pairs, etc.) corresponding to the request of the user. Therefore, using the first ML model, the process 800 may review the content based on the request of the user.

At 806, the process 800 may determine a first confidence associated with the predicted output(s) of the first ML model. For example, in searching the content, the first ML model may have a first confidence score associated with fields of interest that correspond to the request of the user. By way of example, if the user requests the content review service 106 to label and/or identify stop signs within an image, the first confidence may represent a confidence of the first ML model identifying an object within the image as a stop sign. In this sense, the first confidence represents a confidence of the result, or predicted output, of the first ML model. For example, the first ML model may be 98 percent confident that an image contains a stop sign.

At 808, the process 800 may determine whether the first confidence is greater than a second confidence. For example, at 808, the process 800 may determine whether the first confidence is trustworthy. Comparing the first confidence against the second confidence may attempt to verify that the result or predicted output of the first ML model is accurate. In doing so, the process 800 may compare the first confidence against the second confidence to decide, or determine, whether the first confidence is above or below the second confidence (e.g., threshold) for use in determining whether to request a review of the content. To determine the second confidence, the process 800 may utilize a calibration set for a second ML model.

For example, as illustrated, at 810 the process 800 may determine a calibration set for the second ML model. The calibration set used to train the second ML model may include random samplings of content or content that has been identified with high confidences. In other instances, the calibration set may include content labeled by human reviewers. The calibration set may therefore be utilized to train the second ML model to identify, search, or review particular field(s) of interest or content.

At 812, the process 800 may determine the second confidence associated with the accuracy of the first ML model. For example, through analyzing the calibration set, the process 800 may determine the second confidence associated with the accuracy of the first ML model. This second confidence may continuously or dynamically update based on the calibration set. In this sense, the second ML model may determine a confidence threshold (e.g., the second confidence) utilized when checking the first confidence, and for use in determining whether to trust the first confidence of the first ML model. For example, even though the first ML model may be 98 percent accurate that the image contains the stop sign, the predicted outputs of the first ML model may not be accurate. Hence, by comparing the first confidence with a second confidence that is trained via a calibration set, the results of the first ML model may be checked prior to submitting the content for review. For example, the process 800 may determine that the first ML model is accurate 60 percent of the time, and may determine that results of the first ML model are trustworthy or above a certain confidence level.

If at 808 the process 800 determines that the first confidence is greater than the second threshold, the process 800 may follow the "YES" route and proceed to 814. At 814, the process may determine to not transmit the content for review. For example, the process 800, from 808, may determine that the prediction of the first ML model is above the second confidence and that the output of the first ML model is trustworthy.

Conversely, if at 808 the process 800 determines that the first confidence is not greater than the second confidence, the process 800 may follow the "NO" route and proceed to 816. At 816, the process 800 may transmit the content for review by one or more reviewer(s).

At 818, the process 800 may receive results of the review(s). For example, the process 800 may receive indications confirming or adjusting the results of the predicted outputs of the first ML model. The indications, for example, may indicate that one or more stop signs were identified in the image and which were not detected by the first ML model, may confirm that the first ML model accurately identified the stop signs, and so forth. Based on the review(s), the results or the content may be included within the calibration set for use in determining the second confidence. Accordingly, the review(s) of the one or more reviewer(s) may be used update the confidence of the first ML model accurately predicting field(s) of interest.

In some instances, the process 800 may illustrate a stateful calibrated adaptive threshold technique whereby the calibration set evolves overtime. Such scenario may be useful for large compilations of data in order to use more recent (or otherwise relevant) information for calibrating the threshold. However, the thresholding techniques discussed herein may find use in other techniques as well, such as stateful calibrated non-adaptive. In this example, users may provide the expected accuracy threshold of the ML model predicted output against human labelers, and process may automatically find the confidence threshold. To find the confidence threshold, a calibration set may be determined, and in the non-adaptive scenario, the calibration set does not change over time.

FIG. 9 illustrates a user interface 900 for creating a review. In some instances, the user interface 900 may be presented on a device of a user as the user requests a review from the content review service 106 (e.g., the user device 108). As discussed, utilizing the user interface(s), the user may define the condition(s) and/or criteria associate with creating a review.

The user interface 900 is shown within which a user may insert or select criteria associated with review content. Within the user interface 900, the user may define a name 902 of the review, as well as a location 904 where the content is located.

The user may also select a task (e.g., the task(s) 136) associated with the review. For example, as illustrated, the user may select a task associated with key value pair extraction, a task associated with image recognition, a task associated with machine learning models, and/or a custom task. As discussed hereinabove, the task associated with key value pair extraction may involve the content review service searching or analyzing the content for key value pairs. In some instances, the user may further define specific key value pairs the user would like to search for within the content (e.g., employee names, company name, etc.). In some instances, the user may define confidence associated with the individual or particular key value pairs. Otherwise, the user may simply request that key value pairs be reviewed, determined, or extracted from the content. The image recognition tasks may include a review of the content to identify certain subject matter, such as explicit content. For example, the image recognition task may identify people in swimwear as compared to nudity. The user may also define custom tasks as well.

As shown, the user has selected the key value pair extraction task. In doing so, the content review service 106 may be configured to identify key value pairs within the content. In some instances, these key value pairs may be defined or limited by the user, or the content review service 106 may search the content for any key value pairs. Additionally, upon selecting the task, the user may define condition(s) (e.g., the condition(s) 116) associated with the review of the content. For example, the user may include condition(s) associated with when key value pairs are sent for human review.

For example, an identification value 906 may represent a confidence score for deciding if two identified fields have a key value relationship. That is, in the review of the content, if the confidence that two fields (e.g., the key and the value) is below the identification value 906, the two fields, or the pair, may be sent for review. In some instances, the user may insert a value between 0 and 100 for the identification value 906. The user may also select a quality value 908, which represents a confidence score for the text within the fields of the key value pairs. That is, the text within the fields as identified are a key value pair. In some instances, the user may insert a value between 0 and 100 for the quality value 908.

By way of example, envision that the user would like to extract employee names from the content. Here, the identification value 906 would represent the confidence whether the fields identified are associated with, include, or represent the names of the employee and the quality value 908 would represent the confidence in the words of the fields (e.g., confidence in key "word" such as a field "employee name" within the content and confidence in value "word" e.g., "John Doe" within the content). In some instances, the confidence around these words may be determined and if any of the words has a confidence lower than a threshold the review may be triggered. That is, if the content review service 106 is less than 90 percent confident that the fields are a key value pair and/or that the words within the fields are a key value pair, then the content may be triggered for human review. However, as noted above, the user may specific other condition(s) for when human review is triggered. Additionally, or alternatively, if the average confidence or summation of the confidences is lower than a threshold, the human review may be triggered.

The user may also select a random sampling 910 of the content for human review. For example, the random sampling 910, or an audit of the results of the review, may represent a random sampling of determined key value pairs that have a confidence above and/or below the identification value 906 and/or above and/or below the quality value 908. This random sampling 910 may ensure a quality of the content review service and that the ML models are accurate. In some instances, the user may input a value between 0 and 100 for the random sampling 810.

Although the user interface 900 is shown including certain material or content, additional fields may be presented to the user. Additionally, or alternatively, multiple user interfaces may be presented. Through the series or multiple user interfaces, the user may define the conditions and/or the criteria associated with the review. For example, the user may select among template (e.g., the template(s) 162) when creating the review. In some instances, the user may create their own custom templates that the reviewers use for reviewing the content. Users may also input instructions for the reviewers during the review of their tasks. For example, the user may request that the reviewers review the key value pairs and to correct them if they do not match the provided content. The users may also select the types of reviewers that are assigned for reviewing the content. For example, users may select between reviewers of the content review service 106, private reviewers the user has sourced, and/or third-party reviewers contracted or associated with the content review service 106. In some instances, the user may also specify a price per task. Additionally, or alternatively, the content review service 106 may determine a price per task based on the provided condition(s).

After selecting the conditions and specifying the criteria associated with the review, the user may create the task. Herein, a dashboard of the interface of the user with the content review service may be updated to indicate the newly created tasks. Additionally, after creating, the task may be assigned to reviewer(s) of the content review service 106 (or as otherwise chosen by the user during the creation of the task).

FIGS. 10-17 illustrate a sequence of user interfaces for presenting reviews to a reviewer. In some instances, the sequence of user interfaces may be presented on a device of a reviewer. Utilizing the user interfaces, the reviewer may interact with the device to perform the review.

Beginning with FIG. 10, a user interface 1000 is shown. After the user has created the task, or the review, the task may show up on a dashboard of the reviewer. The dashboard, as shown in the user interface 1000, may illustrate the tasks to be reviewed by the reviewer. For each reviewer, his or her dashboard may reflect those reviews to be completed. As shown, each review may include a name, the type of task to be completed (or reviewed), the status (e.g., for review, completed, in progress, and so forth), as well as a creation time and/or a completion data. The dashboard may also indicate when the reviews are to be completed by the reviewer (e.g., a deadline). In some instances, the reviews may be organized or sorted in their respective categories (e.g., status). Additionally, or alternatively, the reviews may be prioritized within the dashboard depending on the severity of time-sensitive nature of the review. For example, those reviews that are a priority or have been requested for prompt review may be presented in descending order on the dashboard. Upon selecting a review, the reviewer may review that review, as discussed herein. Accordingly, the dashboard may see the metrics or guidelines for the reviews, as well as the total number of completed and/or pending reviews for images, text, and/or video content.

In FIG. 11, the reviewer has selected one of the reviews for review. The user interface 1100 may include separate regions, such as a first portion 1102 that represents or content 1104 being reviewed by the reviewer (e.g., the content that the reviewer is requested or being requested to review). A second portion 1106 may include item(s) for review. For example, as discussed above, the content 1104 may be reviewed for certain fields of interest using one or more ML model(s). The results, or predictions, of the ML model(s) may be output for review based on confidence scores or other user-defined criteria.

For example, the user may request to search the content 1104 to identify a company name. In searching the content 1104 for the key "company name" and like aliases (e.g., business, business name, corporation, etc.) values corresponding to the key may be determined or which contextual fields of interest map together. If the confidence that the key and the value are a pair is less than a threshold, the user interface 1100 may present these key value pairs for review in the second portion 1106 of the user interface 1100.

The second portion 1106 of the user interface 1100 indicates that the reviewer has four key value pairs for review, such as a first key value pair 1108(1), a second key value pair 1108(2), a third key value pair 1108(3), and a fourth key value pair 1108(4). In some instances, the key value pairs may be surfaced for review based on a confidence that the words are a key value pair. For example, the key value pairs presented in the second portion 1106 may include key value pairs determined to have a low confidence (e.g., are low-confidence key value pairs) and/or condition(s) as specified by the user when searching the content. By way of example, for the first key value pair 1108(1) for review, the key may include searching the content 1104 for the key "company name." That is, the user may request that the content 1104 be searched to identify company names. Aliases of the key "company name" may also be searched (e.g., corporation, business, etc.). Here, the returned value for the first key value pair 1108(1) may include "Allordable Lawn Care." As discussed herein, the reviewer may interact with the second portion 1106 for updating and/or adjusting the first key value pair 1108(1).

The user may specify other key value pairs for review, or which the ML model(s) have identified. In some instances, these additional key value pairs may be requested by the user or may be surfaced for review by the ML model(s). For example, the second key value pair 1108(2) may indicate a key of "affordablelawn@gmx.com" and a value of "589-802-2987." The key for the second key value pair 1108(2) may represent an email address and the value of the second key value pair 1108(2) may represent a phone number. In this sense, the second key value pair 1108(2) may not represent a correct or accurate key value pair and during the review, the reviewer may correct the second key value pair 1108(2).

The third key value pair 1108(3) may indicate a key of "Commission fee" and a value may be blank. Here, for example, the content 1104 may have been searched for a commission fee, but no value may have been found within the content 1104.

The fourth key value pair 1108(4) may indicate a key of "Term" but the search of the content 1104 may not surface the value from the content 1104.

As illustrated, each of the first key value pair 1108(1), the second key value pair 1108(2), the third key value pair 1108(3), and the fourth key value pair 1108(4) may have been identified or predicted as key value pairs within the content 1104, as indicated by the checked "YES" box within the second portion 1106. During the review, the reviewer may correct such classification or entries. Additionally, as noted above, the first key value pair 1108(1), the second key value pair 1108(2), the third key value pair 1108(3), and the fourth key value pair 1108(4) may be requested by the user and/or the search may surface these key value pairs for review, despite not being requested by the user.

In some instances, the key value pairs within the second portion 1106 may be presented in order of important, order of confidence, or in any other manner. For example, the first key value pair 1108(1) may be a most confidence key value pair as determined by the ML model(s), while the fourth key value pair 1108(4) may be a least confidence key value pair as determined by the ML model(s). However, although presented in a specific order, the reviewer may choose to review the first key value pair 1108(1), the second key value pair 1108(2), the third key value pair 1108(3), and the fourth key value pair 1108(4) in any order. Additionally, although the user interface 1100 illustrates four key value pairs being presented at a single time, in some instances, the user interface 1000 may present one key value pair at a time. For example, the second portion 1106 may display the first key value pair 1108(1) for review, and after the reviewer reviews the first key value pair 1108(1), the second key value pair 1108(2) may be displayed. This process may repeat until all the key value pairs are reviewed by the reviewer.

Although the user interface 1100 illustrates the second portion 1106 presenting four key value pairs, in some instance, the second portion 1106 and/or the user interface 1100 may present other prompts or requests for the reviewer to perform. For example, the second portion 1106 may request the reviewer to locate values for certain keys. Such prompt may ask the reviewer to locate key value pairs within the content 1104. Additionally, or alternatively, the reviewer may add in additional detail that is not based on the ML model(s) predictions or outputs, but rather may be additional information within the content 1104. For example, the reviewer may label or identify objects within the content 1104.

In instances where more than or less than four key value pairs are presented for review, the reviewer may scroll (e.g., vertical) within the second portion to display or surface more key value pairs for review.

FIG. 12 illustrates a user interface 1200 showing example instructions that may be presented to the reviewer during a review of the content 1104. In some instances, the instructions may be presented in unison with the first portion 1102 and/or the second portion 1106. As shown, the first portion 1102 and/or the second portion 1106 may not be to scale on the user interface 1200 in order to discuss the instructions presented the review. In some instances, the instructions may be presented within a third portion 1202 that is positioned adjacent (e.g., to the left of) the first portion 1102. However, in some examples, the instructions may be presented elsewhere within the user interface 1200. Additionally, or alternatively, in some instances, the user interface 1200 may present the instructions and then the reviewer may hide the instructions within the user interface 1200 and/or may review the instructions before reviewing the content 1104, at which time the instructions may be removed from the user interface 1200. Using the instructions, the reviewer may review the content 1104.

Figure 13:
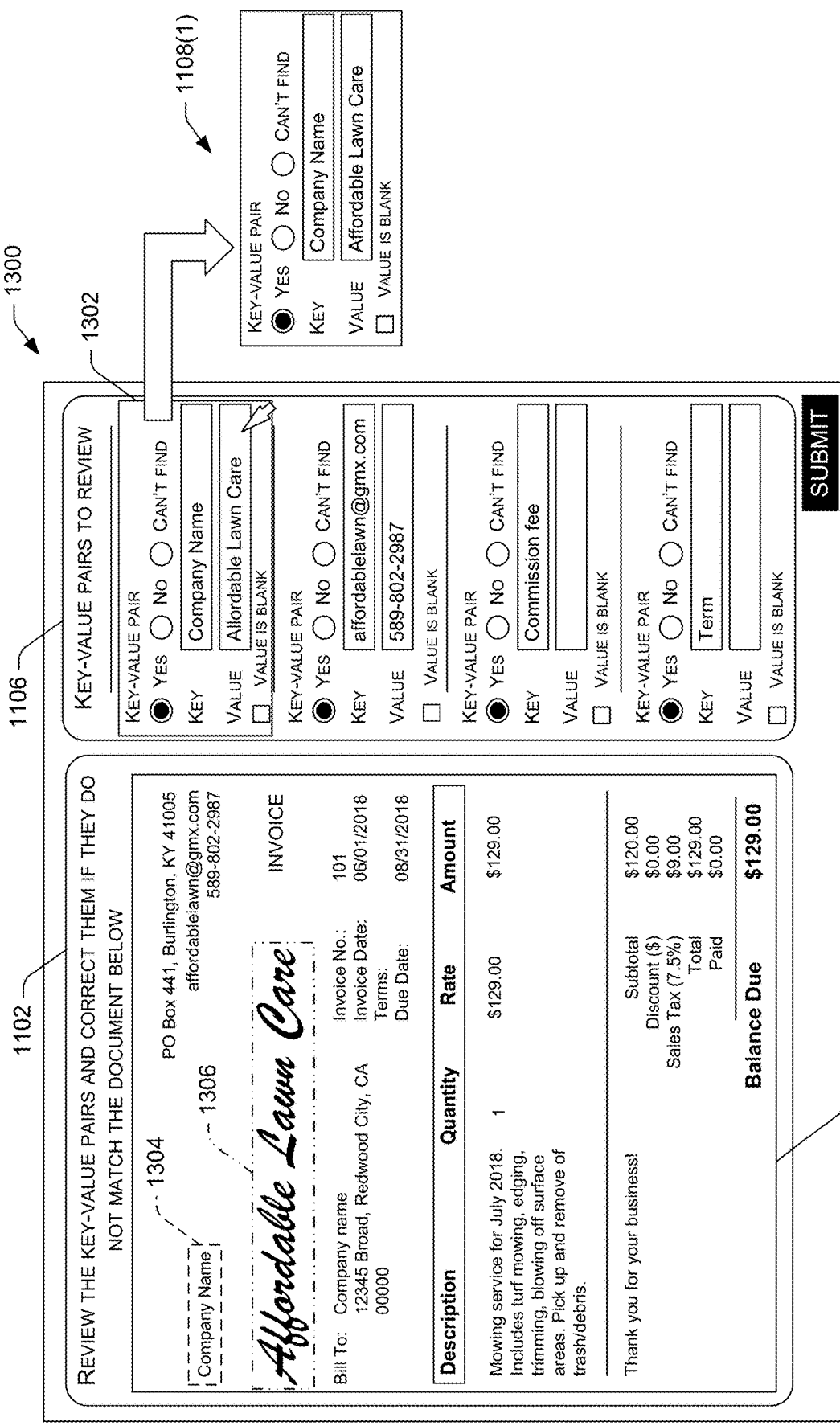
FIG. 13 illustrates an example user interface of a reviewer reviewing content, according to an embodiment of the present disclosure.

FIG. 13 illustrates a user interface 1300 showing the user adjusting the first key value pair 1108(1). Here, the reviewer may be permitted to adjust the first key value pair 1108(1) through hovering a mouse, pointer, or other indicator within an area 1302 of the second portion 1106 associated with the first key value pair 1108(1). Additionally, clicking or hovering within the area 1302 may indicate the predicted key and/or the predicted value within the content 1104 presented within the first portion 1102. For example, the user interface 1300 may display a first box 1304 around the predicted key of the first key value pair 1108(1) and a second box 1306 around the predicted value of the first key value pair 1108(1). The first box 1304 may assist the reviewer in locating the key of the first key value pair 1108(1) within the content 1104 while the second box 1306 may assist the reviewer in locating the value of the first key value pair 1108(1) within the content 1104. In other words, the first box 1304 and the second box 1306 may be used by the reviewer when reviewing the content 1104 for determining whether the first key value pair 1108(1) is actually a key value pair.

Upon clicking or hovering within the area 1302 the reviewer may modify one or more characteristics of the determined first key value pair 1108(1). For example, the reviewer may correct the value from "Allordable Lawn Care" to "Affordable Lawn Care." During the searching of the content 1104, for example, the search may have correctly identified that first key value pair 1108(1) as a correct or accurate key value pair, but have may errored in the spelling of the value of the first key value pair 1108(1). As such, the reviewer may indicate that the first key value pair 1108(1) is an accurate key value pair as "Affordable Law Care" is the "Company name" within the content 1104 and through keeping the "YES" box checked. After correcting the spelling, the user interface 1300 may update the first key value pair 1108(1) as displayed within the second portion 1106.

In some instances, the key and the value of the first key value pair 1108(1) may be highlighted or otherwise indicated within the content 1104. For example, the first box 1304 may include a first color, or first highlight, while the second box 1306 may include a second color, or second highlight. Such indications may visually assist the user in locating the first key value pair 1108(1) within the content 1104 for determining whether the first key value pair 1108 (1) is an accurate key value pair and/or adjusting the key value pair.

Figure 14:
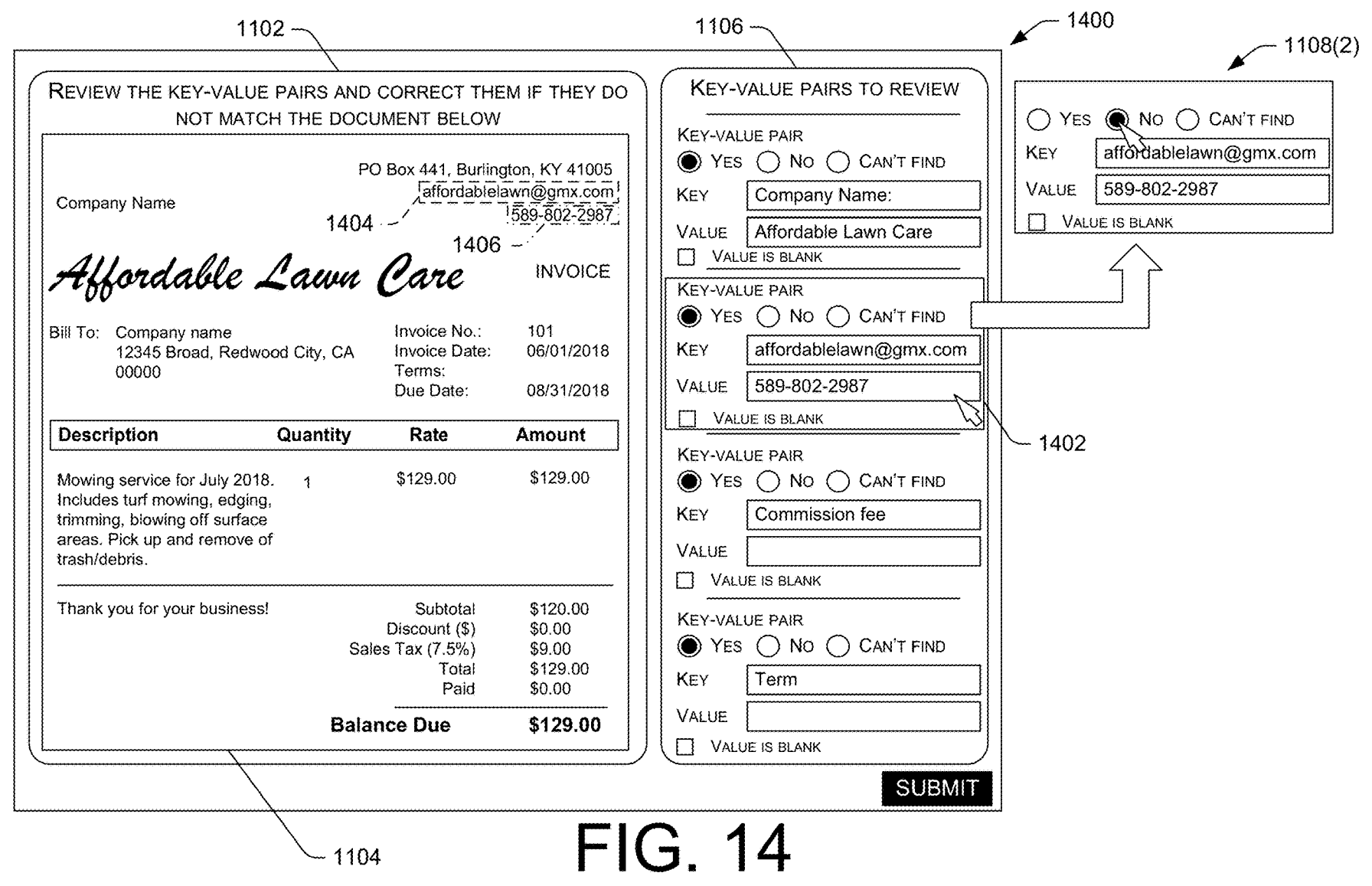

FIG. 14 illustrates a user interface 1400 showing the user adjusting the second key value pair 1108(2). Here, the reviewer may be permitted to adjust the second key value pair 1108(2) through hovering a mouse, pointer, or other indicator within an area 1402 of the second portion 1106 associated with the second key value pair 1108(2). Additionally, clicking or hovering within the area 1402 may indicate the predicted key and/or the predicted value within the content 1104 presented within the first portion 1102. For example, the user interface 1400 may display a first box 1404 around the predicted key of the second key value pair 1108(2) and a second box 1406 around the predicted value of the second key value pair 1108(1). The first box 1404 may assist the reviewer in locating the key of the first key value pair 1108(2) within the content 1104 while the second box 1406 may assist the reviewer in locating the predicted value of the second key value pair 1108(2) within the content 1104 for user in determining whether the second key value pair 1108(3) is actually a key value pair.

Upon clicking or hovering within the area 1402 the reviewer may modify one or more characteristics of the determined second key value pair 1108(2) as determined. For example, the predicted key (i.e., "affordablelawn@gmx.com") may not be a key of the predicted value (i.e., 589-802-2987). Instead, by way of example, a key may include "email address" and an associated value may include "affordablelawn@gmx.com" and/ or a key may include "phone number" and an associated value may include "589-802-2987." However, the key and the value of the second key value pair 1108(2) may not be associated or related with one another. Accordingly, as shown, the reviewer may click within a "NO" box presented within the user interface 1400 to indicate that "affordablelawn@gmx.com" and 589-802-2987 are not a key value pair. Such indication that the second key value pair 1108(2), as predicted, is not a key value pair may be used to update or retrain one or more ML model(s) for better accurately identifying key value pairs with the content 1104 or additional content.

In some instances, the predicted key and the predicted value of the second key value pair 1108(2) may be highlighted or otherwise indicated within the content 1104 (e.g., highlighted).

Additionally, the user interface 1400 illustrates that the value of the first key value pair 1108(1) within the second portion 1106 has been updated with "Affordable Lawn Care" to indicate the correct spelling and based on the reviewer correcting the spelling of the value, as discussed above in FIG. 13.

FIG. 15 illustrates a user interface 1500 showing the user adjusting the third key value pair 1108(3). Here, the reviewer may be permitted to adjust the third key value pair 1108(3) through hovering a mouse, pointer, or other indicator within an area 1502 of the second portion 1106 associated with the third key value pair 1108(3). As shown, the third key value pair 1108(3) may include a predicted key of "Commission fee" while the predicted value may be left blank. Here, for example, the search of the content 1104 may be unable to locate a value of the predicted key associated with the third key value pair 1108(3) within the content 1104. Additionally, or alternatively, the content 1104 may not include the key, or aliases of key (e.g., aliases of "Commission fee"), within the content 1104. For example, as shown, the first portion 1102 of the user interface 1500 may not include boxes that identify the predicted key within the content 1104. Upon reviewing the third key value pair 1108(3), for example, the reviewer may review or otherwise scan the content 1104 in an attempt to locate a commission or aliases of a commission fee (e.g., transaction fee, sales commission, transaction cost, etc.).

Here, however, as shown, the content 1104 may not include such terms, or keys, and hence, the reviewer may click or select a box "Can't Find." This indication may indicate that that the reviewer is unable to find a commission fee (or like aliases) within the content 1104. Such indication may be utilized to indicate that the content 1104 does not include a commission fee.

Additionally, the user interface 1500 illustrates that the second key value pair 1108(2) within the second portion 1106 has been updated to indicate that the key and the value are not a key value pair.

Figure 16:
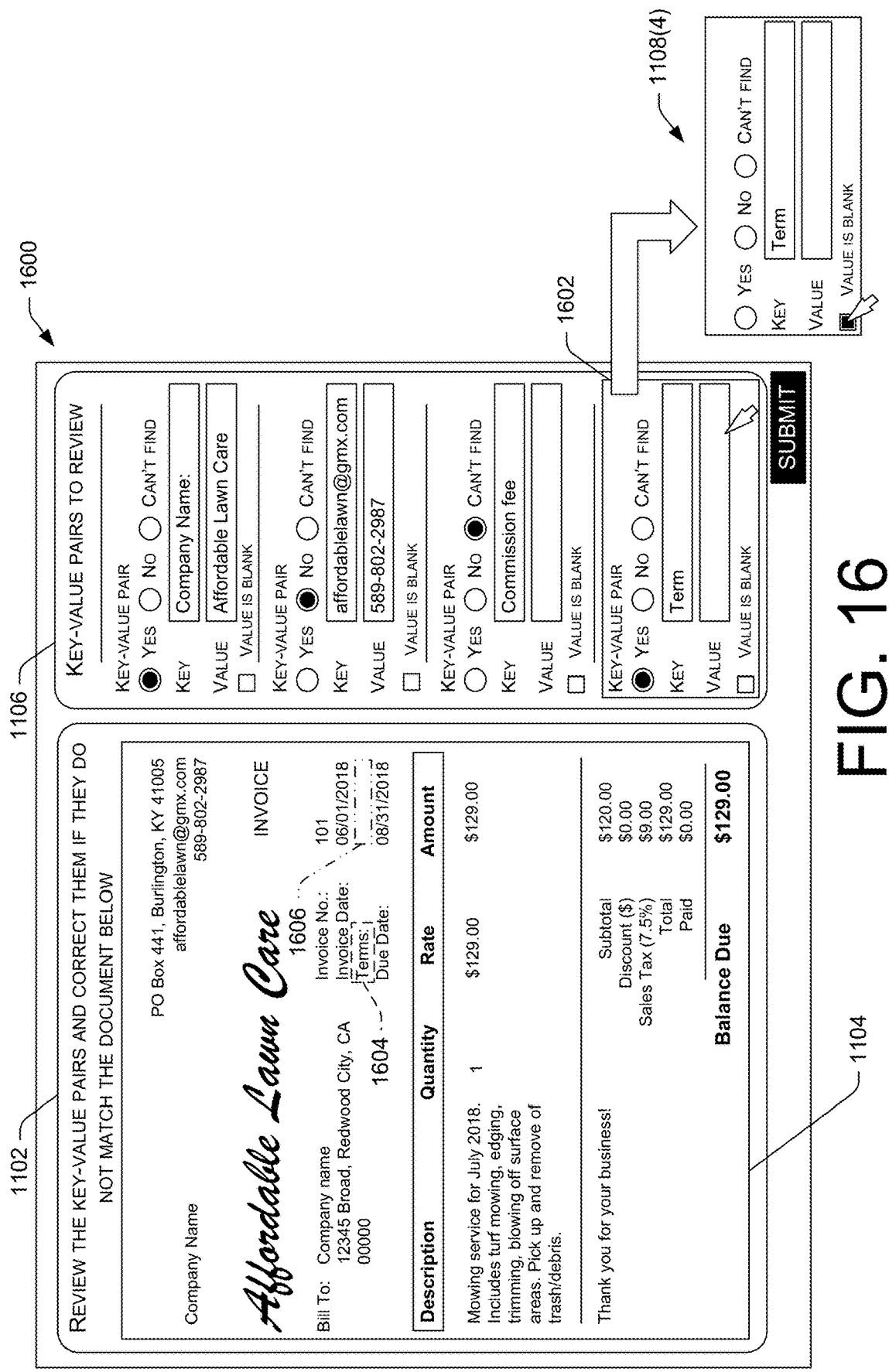
FIG. 16 illustrates an example user interface of a reviewer reviewing content, according to an embodiment of the present disclosure.

FIG. 16 illustrates a user interface 1600 showing the user adjusting the fourth key value pair 1108(4). Here, the reviewer may be permitted to adjust the fourth key value pair 1108(4) through hovering a mouse, pointer, or other indicator within an area 1602 of the second portion 1106 associated with the fourth key value pair 1108(4). Additionally, clicking or hovering within the area 1602 may indicate the predicted key and/or the predicted value within the content 1104 presented within the first portion 1102.

For example, the user interface 1600 may display a first box 1604 around the predicted key of the fourth key value pair 1108(4) and a second box 1606 within the content 1104 associated with the key of the fourth key value pair 1108(4). The first box 1604 may assist the reviewer in locating the key of the fourth key value pair 1108(4) within the content 1104 while the second box 1606 may assist the reviewer in locating the predicted value of the fourth key value pair 1108(4) within the content 1104. However, as shown, the second box 1606 may not include a value (or a value associated with the term). That is, while the key "term" was identified within the content 1104, the content 1104 may not include a value for the key. In some instances, the second box 1606 may be located within an area of the content 1104 associated with a predicted location of the value of the key.

As such, because the content 1104 does not include a value for the key "term" the reviewer may select a box "value is blank" within the second portion 1106 of the user interface 1600 associated with the fourth key value term 1108(4). Such indication may be utilized to indicate that the content 1104 includes the key "term" but does not include an associated value.

In some instances, the predicted key and the predicted value of the fourth key value pair 1108(4) may be highlighted or otherwise indicated within the content 1104 (e.g., highlighted).

Additionally, the user interface 1600 illustrates that the value of the third key value pair 1108(3) within the second portion 1106 has been updated to indicate that the reviewer cannot find the value associated with the key (e.g., Commission fee) within the content 1104.

FIG. 17 illustrates a user interface 1700 after the reviewer has reviewed the key value pairs within the second portion 1106. For example, the user interface 1700 shows the first key value pair 1108(1), the second key value pair 1108(2), the third key value pair 1108(3), and the fourth key value pair 1108(4) being adjusted or confirmed as described above with regards to the user interface 1300, the user interface 1400, the user interface 1500, and/or the user interface 1600, respectively.

After performing the reviews, the reviewer may submit the review. Therein, the reviews (e.g., confirmations and/or adjustments) may by the reviewer may be utilized to confirm the accuracy of the ML model(s) that predicted the first key value pair 1108(1), the second key value pair 1108(2), the third key value pair 1108(3), and the fourth key value pair 1108(4). The ML model(s) may then be retrained based on the reviews to permit more accurate predictions in future instances.

Furthermore, and submitting the reviews of the content 1104, additional content may be presented for review. In this sense, the reviewer may review the content 1104, perform the reviews associated with the content 1104, and after submitting the reviews, may be presented an additional piece of content for review. In this sense, the human reviewers may add a next level of intelligence for the reviews. This additional piece of content may be associated with respective reviews that are similar to and/or different than the reviews of the content 1104. For example, the reviewer may be presented reviews associated with objects identified in an image.

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors; and
   one or more non-transitory computer-readable media storing computer-executable instructions that, when executed by the one or more processors, cause the one or more processors to perform acts comprising:
   determining a first machine learning (ML) model for identifying a field of interest within content, the first ML model having a first confidence associated with identifying the field of interest;
   determining a second machine learning (ML) model for determining a meaning associated with the field of interest, the second ML model having a second confidence associated with determining the meaning;
   determining that at least one of the first confidence is less than a confidence threshold or the second confidence is less than the confidence threshold;
   generating a review associated with the field of interest based at least in part on the at least one of the first confidence or the second confidence being less than the threshold confidence;
   transmitting the review to one or more reviewers, wherein the one or more reviewers at least one of confirm the field of interest or adjust the meaning associated with the field of interest;
   receiving an indication associated with the one or more reviewers confirming the field of interest or adjusting the meaning associated with the field of interest; and
   updating at least one of the first confidence of the of the first ML model or the second confidence of the second ML model based at least in part on the indication.

2. The system of claim 1, the acts further comprising receiving a request to search for the field of interest within the content, and wherein:

the review identifies the field of interest within the content and the meaning of the field of interest; and
the indication identifies that at least one of:
the field of interest corresponds to the field of interest within the request; or
the field of interest does not correspond to the field of interest within the request.

3. The system of claim 2, wherein:
updating the first confidence comprises one of:
updating the first confidence to a third confidence based at least in part on the field of interest corresponding to the field of interest, the third confidence being greater than the first confidence; or
updating the first confidence to a fourth confidence based at least in part on the field of interest not corresponding to the field of interest, the fourth confidence being less than the first confidence; and
updating the second confidence comprises one of:
updating the second confidence to a fifth confidence based at least in part on the field of interest corresponding to the field of interest, the fifth confidence being greater than the second confidence; or
updating the first confidence to a sixth confidence based at least in part on the field of interest not corresponding to the field of interest, the sixth confidence being less than the second confidence.

4. A method comprising:
determining a request associated with reviewing content for a field of interest;
determining, based at least in part on the request, a first confidence associated with reviewing the content to identify the field of interest;
determining a machine learning (ML) model for reviewing the content to identify the field of interest, the ML model being associated with a first threshold confidence;
determining, based at least in part on the ML model, a second confidence associated with the ML model determining that the content includes the field of interest;
determining that the second confidence is less than the first confidence threshold;
determining that the second confidence is less than the first threshold confidence;
transmitting the field of interest to a reviewer in association with at least a portion of the content to be reviewed;
receiving an indication associated with the reviewer reviewing the content; and
updating the first confidence threshold associated with the ML model identifying the field of interest to a second confidence threshold based at least in part on the indication.

5. The method of claim 4, wherein the indication confirms that the field of interest as determined by the ML model corresponds to the field of interest within the request, and wherein updating the first confidence threshold to the second confidence threshold corresponds to the ML model accurately identifying the field of interest.

6. The method of claim 5, further comprising:
receiving an additional request associated with reviewing additional content for the field of interest;
determining, based at least in part on the ML model, a third confidence associated with the ML model determining that the additional content includes the field of interest; and
determining that the third confidence is greater than the first confidence threshold.

7. The method of claim 4, wherein the indication is associated with the reviewer determining that the field of interest as determined by the ML model does not correspond to the field of interest within the request, and wherein updating the first confidence threshold to the second confidence threshold corresponds to the ML model not accurately identifying the field of interest.

8. The method of claim 7, further comprising:
receiving an additional indication associated with an actual field of interest that corresponds to the field of interest within the request; and
retraining the ML model to accurately identify the field of interest within additional content provided to the ML model based at least in part on the additional indication.

9. The method of claim 4, wherein transmitting the field of interest to the reviewer in association with the at least the portion of the content to be reviewed comprises transmitting the field of interest to a device of the reviewer, and wherein:
the device is configured to display the field of interest in association with the at least the portion of the content, and
the reviewer is permitted to interact with the device to input data associated with the indication and reviewing the content.

10. A method comprising:
determining a first machine learning (ML) model associated with identifying a field of interest within content;
determining a second ML model associated with the identifying the field of interest within the content;
identifying, via the first ML model and at a first confidence, a field within the content corresponding to the field of interest;
identifying, via the second ML model and at a second confidence, the field within the content corresponding to the field of interest;
receiving an indication associated with a review of the field; and
determining an updated first ML model associated with identifying the field of interest and an updated second ML model associated with identifying the field of interest.

11. The method of claim 10, further comprising:
determining that at least one of the first confidence or the second confidence is less than a threshold confidence; and
transmitting the field of interest and at least a portion of the content for review.

12. The method of claim 11, wherein transmitting the field of interest and at least a portion of the content comprises transmitting data to a device, wherein the device is configured to display the field of interest in association with the at least the field of interest and a portion for a reviewer confirming or adjusting characteristics of the field of interest.

13. The method of claim 10, wherein the indication indicates that the field within the content does not correspond to the field of interest, determining the updated first ML model and the update second ML model is based at least in part on the field within the content not corresponding to the field of interest.

14. The method of claim 10, wherein:
the indication indicates that the field within the content corresponds to the field of interest;
the updated first ML model is associated with an updated first confidence threshold that is greater than the first confidence threshold; and the updated second ML model is associated with an updated second confidence threshold that is greater than the second confidence threshold.

15. The method of claim 10, further comprising:
identifying, via the first ML model and at a third confidence, an additional field within the content corresponding to the field of interest;
identifying, via the second ML model and at a fourth confidence, the additional field within the content; and
receiving an additional indication associated with the review of the additional field.

16. The method of claim 15 wherein the additional indication confirms that the additional field corresponds to the field of interest, further comprising:
determining the updated first ML model based at least in part on the additional indication; and
determining the updated second ML model based at least in part on the additional indication.

17. The method of claim 15, wherein the additional indication indicates that at least one of:
the additional field does not correspond to the field of interest; or
an adjustment of a label associated with the additional field.

18. The method of claim 10, wherein:
the first ML model is trained using a first dataset to identify the field of interest, wherein training the first ML model using the first dataset identifies the field of interest at the first confidence; and
the second ML model is trained using a second dataset to at least one of identify the field of interest or determine a meaning of the field of interest, wherein training the second ML model using the second dataset identifies the field of interest at the second confidence.

19. The method of claim 10, wherein the field of interest corresponds to a key value pair:
the first ML model is configured to identify a key and a value associated with the key value pair; and
the second ML model is configured to identify a meaning of the key and the value of the key value pair.

20. The method of claim 10, wherein:
the first confidence is associated with the first ML model accurately identifying the field of interest within the content; and
the second confidence is associated with the second ML model accurately identifying the field of interest within the content.

* * * * *